(12) United States Patent
Chen et al.

(10) Patent No.: US 8,920,732 B2
(45) Date of Patent: Dec. 30, 2014

(54) SYSTEMS AND METHODS FOR ACTIVELY CONTROLLING STEAM-TO-CARBON RATIO IN HYDROGEN-PRODUCING FUEL PROCESSING SYSTEMS

(75) Inventors: Zhen Chen, Bend, OR (US); Xun Ouyang, Bend, OR (US)

(73) Assignee: DCNS, La Montagne (FR)

( * ) Notice: Subject to any disclaimer, the term of this patent is extended or adjusted under 35 U.S.C. 154(b) by 990 days.

(21) Appl. No.: 13/028,044

(22) Filed: Feb. 15, 2011

(65) Prior Publication Data

US 2012/0208099 A1 Aug. 16, 2012

(51) Int. Cl.
*F01N 3/20* (2006.01)
*B01J 8/00* (2006.01)
*B01J 7/00* (2006.01)
*H01M 8/06* (2006.01)
*H01M 8/04* (2006.01)
*C01B 3/38* (2006.01)

(52) U.S. Cl.
CPC .......... *H01M 8/0618* (2013.01); *H01M 8/0432* (2013.01); *H01M 8/04694* (2013.01); *H01M 8/04776* (2013.01); *H01M 8/04992* (2013.01); *C01B 3/384* (2013.01); *C01B 2203/043* (2013.01); *C01B 2203/0445* (2013.01); *C01B 2203/066* (2013.01); *C01B 2203/0811* (2013.01); *C01B 2203/085* (2013.01); *C01B 2203/146* (2013.01); *C01B 2203/1657* (2013.01); *C01B 2203/169* (2013.01); *Y02E 60/50* (2013.01)
USPC ........... 422/105; 422/108; 422/110; 422/111; 422/187; 422/625; 422/107; 422/628; 422/629; 48/61; 48/197 R

(58) Field of Classification Search
USPC .......... 48/61, 197 R; 422/105, 107, 108, 111, 422/625, 187, 628, 629
See application file for complete search history.

(56) References Cited

U.S. PATENT DOCUMENTS

| | | | |
|---|---|---|---|
| 2,824,620 | A | 2/1958 | De Rosset |
| 3,336,730 | A | 8/1967 | McBride et al. |
| 3,338,681 | A | 8/1967 | Kordesch |
| 3,350,176 | A | 10/1967 | Green et al. |
| 3,469,944 | A | 9/1969 | Bocard et al. |
| 3,516,807 | A | 6/1970 | West et al. |
| 3,522,019 | A | 7/1970 | Buswell et al. |
| 3,564,816 | A | 2/1971 | Batta |
| 3,585,077 | A | 6/1971 | Waldman |

(Continued)

FOREIGN PATENT DOCUMENTS

| WO | WO 2007/009176 | 1/2007 |
|---|---|---|
| WO | WO 2008/012658 | 1/2008 |

*Primary Examiner* — Kaity Handal
(74) *Attorney, Agent, or Firm* — Dascenzo Intellectual Property Law, P.C.

(57) ABSTRACT

The present disclosure is directed to systems and methods for actively controlling the steam-to-carbon ratio in hydrogen-producing fuel processing systems that include a feedstock delivery system. The feedstock delivery system supplies a combined feedstock stream including steam and carbon-containing feedstock to a hydrogen-producing region, which produces a mixed gas stream including hydrogen gas as a majority component therefrom. The systems and methods may include measuring a thermodynamic property of a steam stream, a carbon-containing feedstock stream, and/or the combined feedstock stream and controlling the flow rate and/or pressure of a water stream, the steam stream, and/or the carbon-containing feedstock stream based on a desired steam-to-carbon ratio in the combined feedstock stream and/or a desired flow rate of the mixed gas stream and may include feedforward and/or feedback control strategies.

13 Claims, 7 Drawing Sheets

(56) References Cited

U.S. PATENT DOCUMENTS

| | | | |
|---|---|---|---|
| 3,585,078 | A | 6/1971 | Sederquist et al. |
| 3,607,419 | A | 9/1971 | Keating |
| 3,655,448 | A | 4/1972 | Setzer |
| 3,745,047 | A | 7/1973 | Fanciullo |
| 3,961,986 | A | 6/1976 | Waldman |
| 3,986,849 | A | 10/1976 | Fuderer et al. |
| 4,002,805 | A | 1/1977 | Waldman |
| 4,098,959 | A | 7/1978 | Fanciullo |
| 4,098,960 | A | 7/1978 | Gagnon |
| 4,122,802 | A | 10/1978 | Noguchi et al. |
| 4,143,620 | A | 3/1979 | Noguchi et al. |
| 4,175,165 | A | 11/1979 | Adlhart |
| 4,214,969 | A | 7/1980 | Lawrance |
| 4,322,383 | A | 3/1982 | Yasuda et al. |
| 4,331,455 | A | 5/1982 | Sato |
| 4,468,235 | A | 8/1984 | Hill |
| 4,477,395 | A | 10/1984 | Albarda |
| 4,585,708 | A | 4/1986 | Abens et al. |
| 4,587,966 | A | 5/1986 | Albarda |
| 5,143,800 | A | 9/1992 | George et al. |
| 5,401,589 | A | 3/1995 | Palmer et al. |
| 5,432,710 | A | 7/1995 | Ishimaru et al. |
| 5,441,559 | A | 8/1995 | Petit et al. |
| 5,498,487 | A | 3/1996 | Ruka et al. |
| 5,637,414 | A | 6/1997 | Inoue et al. |
| 5,766,786 | A | 6/1998 | Fleck et al. |
| 5,861,137 | A | 1/1999 | Edlund |
| 5,997,594 | A | 12/1999 | Edlund et al. |
| 6,083,637 | A | 7/2000 | Walz et al. |
| 6,152,995 | A | 11/2000 | Edlund |
| 6,221,117 | B1 | 4/2001 | Edlund et al. |
| 6,319,306 | B1 | 11/2001 | Edlund et al. |
| 6,375,906 | B1 | 4/2002 | Edlund et al. |
| 6,376,113 | B1 | 4/2002 | Edlund et al. |
| 6,383,670 | B1 | 5/2002 | Edlund et al. |
| 6,419,728 | B1 | 7/2002 | Edlund |
| 6,494,937 | B1 | 12/2002 | Edlund et al. |
| 6,495,277 | B1 | 12/2002 | Edlund et al. |
| 6,497,856 | B1 * | 12/2002 | Lomax et al. ............. 423/651 |
| 6,537,352 | B2 | 3/2003 | Edlund et al. |
| 6,547,858 | B1 | 4/2003 | Edlund et al. |
| 6,562,111 | B2 | 5/2003 | Edlund et al. |
| 6,569,227 | B2 | 5/2003 | Edlund et al. |
| 6,692,545 | B2 | 2/2004 | Gittleman et al. |
| 6,723,156 | B2 | 4/2004 | Edlund et al. |
| 6,740,437 | B2 | 5/2004 | Ballantine et al. |
| 6,783,879 | B2 * | 8/2004 | Skala et al. ................. 429/420 |
| 6,797,418 | B1 | 9/2004 | Nomura et al. |
| 6,811,908 | B2 | 11/2004 | Edlund et al. |
| 6,835,481 | B2 | 12/2004 | Dickman et al. |
| 6,872,379 | B2 | 3/2005 | Zahringer et al. |
| 6,890,672 | B2 | 5/2005 | Dickman et al. |
| 6,979,507 | B2 | 12/2005 | Edlund et al. |
| 7,135,048 | B1 | 11/2006 | Edlund et al. |
| 7,160,367 | B2 | 1/2007 | Babicki et al. |
| 7,208,241 | B2 | 4/2007 | Edlund et al. |
| 7,276,307 | B2 | 10/2007 | Ballantine et al. |
| 7,381,229 | B2 | 6/2008 | Lawrence |
| 7,390,587 | B2 | 6/2008 | Dickman et al. |
| 7,399,342 | B2 | 7/2008 | Bizjak |
| 7,416,569 | B2 | 8/2008 | Sumi et al. |
| 7,521,139 | B2 | 4/2009 | Foger |
| 7,601,302 | B2 | 10/2009 | Edlund et al. |
| 7,608,120 | B2 | 10/2009 | Wunning |
| 7,771,882 | B2 | 8/2010 | Edlund et al. |
| 7,785,539 | B2 * | 8/2010 | Mirkovic et al. ............. 422/105 |
| 7,837,765 | B2 | 11/2010 | Adams et al. |
| 7,842,428 | B2 | 11/2010 | Scharf |
| 7,846,569 | B2 | 12/2010 | Edlund et al. |
| 7,988,925 | B2 * | 8/2011 | Ahluwalia et al. ............. 422/198 |
| 8,615,325 | B2 * | 12/2013 | Li et al. ........................ 700/271 |
| 2001/0045061 | A1 | 11/2001 | Edlund et al. |
| 2002/0108306 | A1 | 8/2002 | Grieve et al. |
| 2003/0192251 | A1 | 10/2003 | Edlund et al. |
| 2003/0223926 | A1 | 12/2003 | Edlund et al. |
| 2004/0028964 | A1 | 2/2004 | Smaling |
| 2005/0266285 | A1 | 12/2005 | Edlund et al. |
| 2006/0024540 | A1 | 2/2006 | LaVen et al. |
| 2006/0090397 | A1 | 5/2006 | Edlund et al. |
| 2007/0266631 | A1 | 11/2007 | Pledger et al. |
| 2008/0138678 | A1 | 6/2008 | Hill |
| 2008/0145297 | A1 | 6/2008 | Johannes et al. |
| 2008/0280171 | A1 | 11/2008 | Maenishi et al. |
| 2009/0142631 | A1 | 6/2009 | Kah |
| 2009/0151249 | A1 | 6/2009 | Adams et al. |
| 2009/0155642 | A1 | 6/2009 | Popham |

* cited by examiner

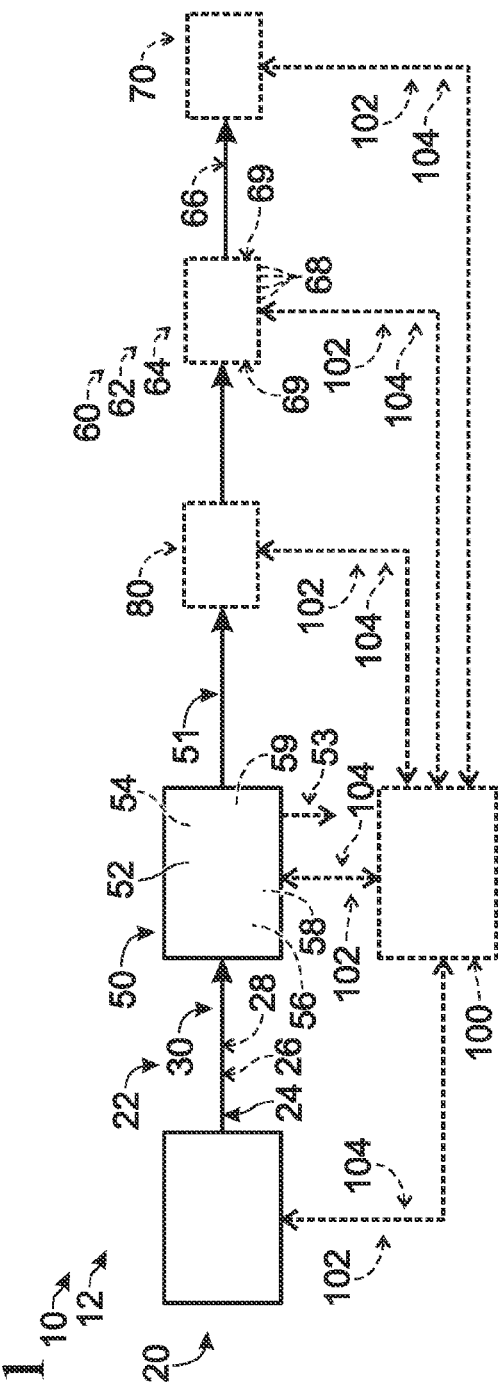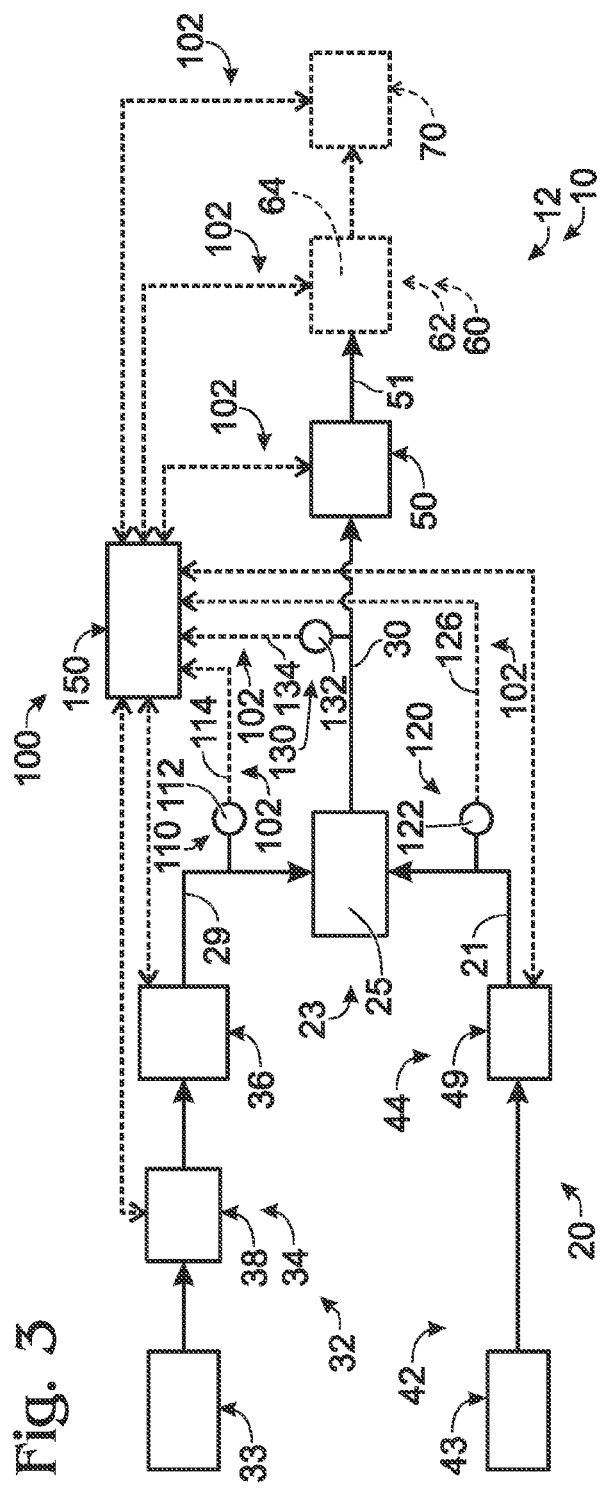

SYSTEMS AND METHODS FOR ACTIVELY CONTROLLING STEAM-TO-CARBON RATIO IN HYDROGEN-PRODUCING FUEL PROCESSING SYSTEMS

FIELD OF THE DISCLOSURE

The following disclosure is directed to systems and methods for controlling the composition of a reactant feed stream that is supplied to a hydrogen-producing fuel processing system, and more particularly to systems and methods for actively controlling the steam-to-carbon ratio in the reactant feed stream for a hydrogen-producing fuel processing system, and to hydrogen-producing fuel processing and fuel cell systems that utilize such systems and/or methods.

BACKGROUND OF THE DISCLOSURE

Hydrogen-producing fuel-processing systems include a hydrogen-producing region that is adapted to convert one or more feedstocks into a product stream containing hydrogen gas as a majority component. This may be accomplished through a variety of mechanisms, such as steam reforming, autothermal reforming, partial oxidation, and pyrolysis. In all of these examples, a fuel, which may be a carbon-containing feedstock such as a hydrocarbon or an alcohol, is combined with an oxygen-containing substance, which may be an oxygen source such as air, oxygen-enriched air, bottled oxygen, water, and/or steam to produce hydrogen gas.

In particular, hydrogen-generating regions that produce hydrogen gas with a steam reforming reaction combine a carbon-containing feedstock (such as methanol or natural gas) and water (in the form of steam) to produce hydrogen gas as a majority component, together with carbon monoxide and carbon dioxide as minority components. Other minority components also may be present in both the feed and product streams. In steam reforming reactors, it is important to control the steam-to-carbon (S/C) ratio of reactants entering the reactor, as a high S/C ratio may cause water to condense in downstream processes, limit system efficiency, and/or impact the overall water balance of the hydrogen-producing fuel processing system. In contrast, low S/C ratios may result in deactivation of the reforming catalyst due to the formation of carbon within the reactor and/or corrosion of the reactor vessel due to metal dusting.

Tight control of the S/C ratio may be accomplished through the use of high-quality feed streams of known composition and purity, together with accurate pumps and/or mass flow control devices that enable precise metering of both the steam stream and the carbon-containing feedstock stream as they enter the steam reformer. In practice, such purity and precision may be difficult and/or costly to achieve and the cost may not always be justifiable. Thus, there exists a need for efficient and cost-effective alternatives that consistently maintain the desired S/C ratio.

SUMMARY OF THE DISCLOSURE

The present disclosure is directed to systems and methods for actively controlling the steam-to-carbon ratio in hydrogen-producing fuel processing systems that receive a combined feedstock stream, which include water and a carbon-containing feedstock, and produce a mixed gas stream including hydrogen gas as a majority component therefrom. As discussed in more detail herein, these systems and methods may include measuring thermodynamic properties of a water stream, a steam stream, a carbon-containing feedstock stream, and/or the combined feedstock stream, and controlling the flow rate and/or pressure of the water stream, the steam stream, and/or the carbon-containing feedstock stream to control the S/C ratio in the combined feedstock stream based at least in part on a desired S/C ratio in the combined feedstock stream and/or a desired flow rate of the mixed gas stream.

In some embodiments, the systems and methods may include the use of a feedforward control strategy to control the flow rate of the steam stream and optionally the carbon-containing feedstock stream based on the desired S/C ratio and the desired flow rate of the mixed gas stream. In some embodiments, the thermodynamic properties may include the temperature of the steam stream, the temperature of the carbon-containing feedstock stream, and/or the temperature of the combined feedstock stream. In such embodiments, the systems and methods may further include calculating an actual S/C ratio in the combined feedstock stream and using a feedback control strategy to adjust the flow rate of the water stream and/or the carbon-containing feedstock stream based thereon. In some embodiments, the thermodynamic property may include the pressure of the carbon-containing feedstock stream and optionally the pressure of the steam stream. In such embodiments, the systems and methods may include the use of a feedback control strategy to maintain the pressure of the carbon-containing feedstock stream at a desired carbon-containing feedstock pressure and/or within a desired carbon-containing feedstock pressure range to maintain the desired S/C ratio. The desired carbon-containing feedstock pressure may be a fixed value or may vary with the value of a variable associated with the flow rate of the steam stream. In some embodiments, the steam stream and the carbon-containing feedstock stream may be combined to produce the combined feedstock stream in a mixing device, which optionally may include a mixing volume, an insulated mixing volume, a velocity pump, and/or a venturi pump.

BRIEF DESCRIPTION OF THE DRAWINGS

FIG. 1 is a schematic representation of illustrative, non-exclusive examples of hydrogen-producing fuel processing systems that may be utilized with the systems and methods according to the present disclosure.

FIG. 3 is a schematic representation of illustrative, non-exclusive examples of reactant delivery systems that may utilize temperature-based S/C ratio control according to the present disclosure.

DETAILED DESCRIPTION AND BEST MODE OF THE DISCLOSURE

Figure 2:
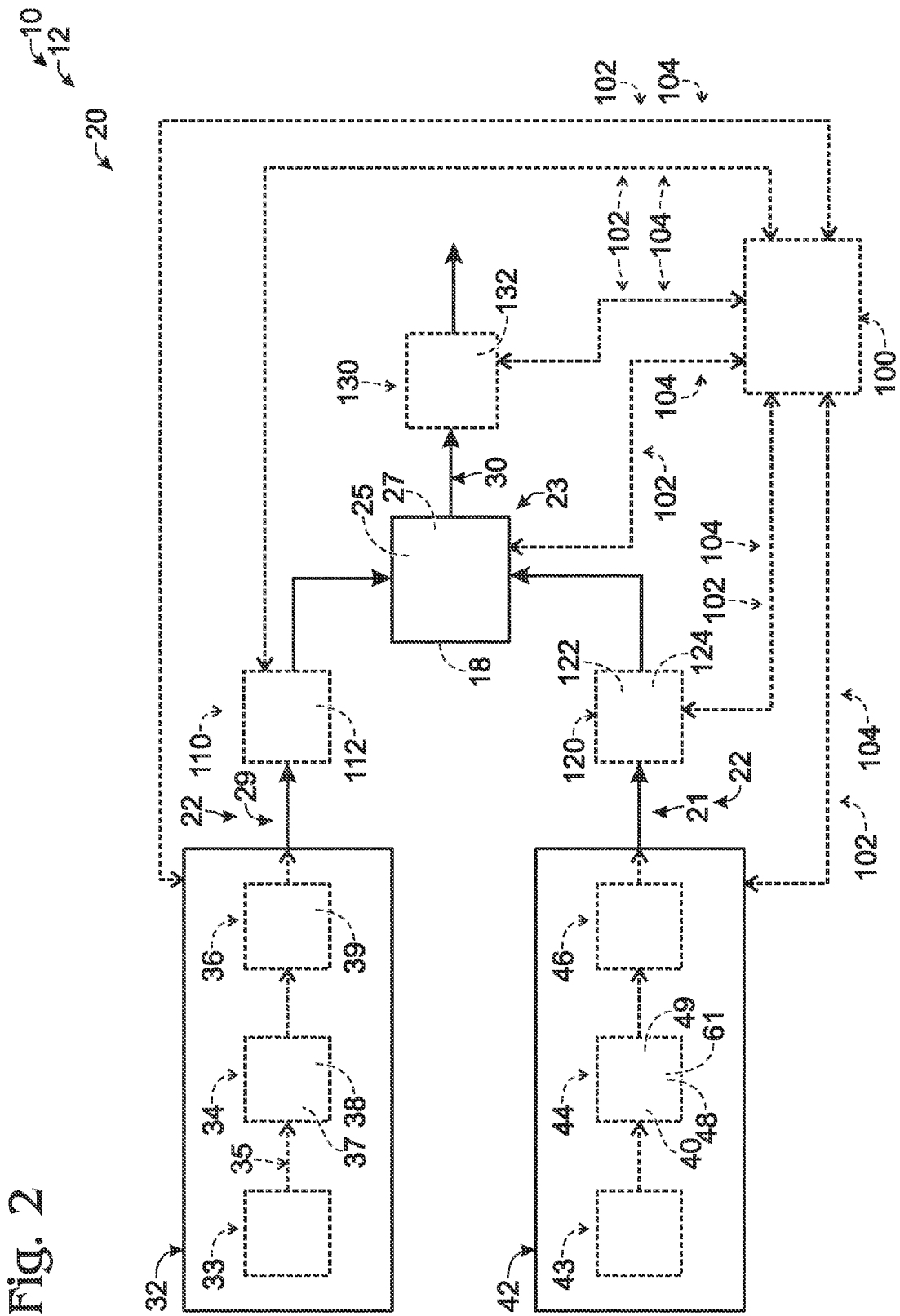
FIG. 2 is a schematic representation of illustrative, non-exclusive examples of reactant delivery systems that may be utilized with the systems and methods according to the present disclosure.

A schematic representation of illustrative, non-exclusive examples of hydrogen-producing fuel processing systems 12 that include a feedstock delivery system 20 and a fuel processing assembly 50 are shown in FIG. 1. Fuel processing assembly 50 also may be referred to as fuel processor 50. Hydrogen-producing fuel processing system 12 also may be referred to as fuel processing system 12 and optionally may form a portion of hydrogen-producing and consuming assembly 10, which produces hydrogen gas and then consumes, or utilizes, the hydrogen gas as a reactant for another portion of the assembly. Hydrogen-producing and consuming assembly 10 may include an optional flow-regulating device 80, a hydrogen-consuming/storing device 60, such as a fuel cell system 62 containing at least one fuel cell stack 64, and/or an energy-consuming device 70. An optional controller 100 may receive status signals 102 indicative of the status of the various components of hydrogen-producing fuel processing system 12 and/or hydrogen-producing and consuming assembly 10 and may generate control signals 104 to regulate or otherwise control the operation of hydrogen-producing fuel processing system 12 and/or hydrogen-producing and consuming assembly 10 based on status signals 102 and/or calculations internal to (i.e., performed by) the controller.

Feed stream(s) 22 may be delivered to a hydrogen-producing region 52 of hydrogen-producing fuel processing system 12 via any suitable mechanism. While a single feed stream 22 is shown in FIG. 1, it is within the scope of the present disclosure that more than one feed stream 22 may be used and that these streams may contain the same or different feedstocks. When feed stream 22 contains two or more components, such as carbon-containing feedstock 24 and water 26, the components may be delivered in the same or different feed streams. As an illustrative, non-exclusive example, when the fuel processor is adapted to produce hydrogen gas from a gaseous or vaporous carbon-containing feedstock and the water is vaporized as steam 28, the feedstock may be delivered with the water component of feed stream 22, such as shown in FIG. 1 by combined feedstock stream 30.

In FIG. 1, feed stream 22 is shown being delivered to fuel processing assembly 50 by feedstock delivery system 20, which schematically represents any suitable mechanism, device, or combination thereof for selectively delivering the feed stream to the fuel processor. Illustrative, non-exclusive examples of feedstock delivery systems are disclosed in U.S. Pat. Nos. 7,601,302, 6,375,906, 7,135,048, and 6,890,672 and U.S. Patent Application Publication No. 2009/0155642, the complete disclosures of which are hereby incorporated by reference. Additional illustrative, non-exclusive examples of feedstock delivery systems according to the present disclosure are discussed in more detail herein.

Fuel processing assembly 50 may include a variety of structures and/or components that are adapted to generate, and optionally purify, a mixed gas stream from the feed stream(s) supplied thereto to produce a product hydrogen stream 51. This may include hydrogen-producing region 52, an optional separation assembly 54, an optional chemical purification assembly 56, and/or a heating assembly 58, as well as any suitable number of flow-regulating devices 59. Product hydrogen stream 51 may contain pure or at least substantially pure hydrogen gas.

Hydrogen-producing region 52 may utilize any suitable process or mechanism to produce hydrogen gas from feed stream(s) 22. The mixed gas stream output from the hydrogen-producing region contains hydrogen gas as a majority component. The mixed gas stream also may include one or more additional gaseous components and thereby may be referred to as a mixed gas stream that contains hydrogen gas as its majority component and which include one or more other gases as minority components. As discussed, illustrative, non-exclusive examples of suitable mechanisms for producing hydrogen gas from feed stream(s) 22 include steam reforming, autothermal reforming, and partial oxidation reforming, in which reforming catalysts are used to produce hydrogen gas from a feed stream 22 containing a carbon-containing feedstock 24 and water 26 with may be reacted as steam 28.

Examples of suitable carbon-containing feedstocks 24 include at least one hydrocarbon or alcohol. Illustrative, non-exclusive examples of suitable hydrocarbons include methane, propane, natural gas, diesel, kerosene, gasoline, and the like. Illustrative, non-exclusive examples of suitable alcohols include methanol, ethanol, and polyols, such as ethylene glycol and propylene glycol. Other suitable mechanisms for producing hydrogen gas from feed stream(s) 22 include ammonia decomposition, electrolysis of water, and water-gas-shift reactions. Illustrative, nonexclusive examples of suitable hydrogen-producing regions and/or mechanisms are disclosed in U.S. Pat. Nos. 6,221,117, 5,997,594, 5,861,137, and in U.S. Patent Application Publication Nos. 2001/0045061, 2003/0192251, and 2003/0223926, the complete disclosures of which are hereby incorporated by reference.

Steam reforming is one example of a hydrogen-producing mechanism that may be employed in hydrogen-producing region 52 in which feed stream 22 comprises water and a carbon-containing feedstock. In a steam reforming process, hydrogen-producing region 52 contains a suitable steam reforming catalyst. In such an embodiment, the fuel processor may be referred to as a steam reformer, hydrogen-producing region 52 may be referred to as a reforming region, and the output, or mixed gas, stream may be referred to as a reformate stream. As used herein, reforming region 52 refers to any hydrogen-producing region utilizing any of the hydrogen-producing mechanisms discussed herein. The other gases that may be present in the reformate stream may include carbon monoxide, carbon dioxide, methane, steam, and/or unreacted carbon-containing feedstock.

As discussed in more detail herein, it may be desirable to control the S/C ratio in feed stream(s) 22, such as combined feedstock stream 30, that are supplied to the fuel processing assembly, including fuel processing assemblies that are configured to produce hydrogen gas via a steam reforming reaction. This may include controlling the S/C ratio to be approximately equal to a desired, or target, value, as well as controlling the S/C ratio to be within a desired, or target, range. The S/C ratio may be defined as the ratio of the number of water molecules contained within a volume of the combined feedstock stream to the number of carbon atoms contained within the volume. Illustrative, non-exclusive examples of S/C ratios according to the present disclosure include S/C ratios between 2:1 and 5:1, including S/C ratios between 2:1 and 4:1, 2:1 and 3:1, 2:1 and 2.5:1, 2:1 and 2.25:1, 2.5:1 and 4.5:1, 2.5:1 and 3.5:1, and between 3:1 and 4:1. Further illustrative, non-exclusive examples of S/C ratios according to the present disclosure include S/C ratios of 2:1, 2.25:1, 2.5:1, 2.75:1, 3:1, 3.25:1, 3.5:1, 4:1, and 4.5:1.

Optional separation assembly 54 may include any suitable structure adapted to separate the mixed gas stream into product hydrogen stream 51 and a byproduct stream 53. Product hydrogen stream 51 typically will have a greater concentration of hydrogen gas than the mixed gas stream, and may have a lower concentration of one or more of the other gases present in the mixed gas stream. In contrast, byproduct stream 53 will have a lower concentration of hydrogen gas than the mixed gas stream and may include a greater concentration of one or more of the other gases present in the mixed gas stream. Illustrative, non-exclusive examples of separation assemblies 54 according to the present disclosure include pressure swing adsorption (PSA) systems and hydrogen-permeable membrane systems, although other systems and methods for separating the mixed gas stream into the product hydrogen stream and the byproduct stream are also within the scope of the present disclosure. Illustrative, non-exclusive examples of separation assemblies that utilize a hydrogen-permeable or hydrogen-selective membrane, including components thereof and methods of operating the same are described in U.S. Pat. Nos. 5,997,594, 6,152,995, 6,221,117, 6,319,306, 6,419,728, 6,494,937, 6,537,352, 6,547,858, 6,562,111, 6,569,227, and 6,723,156 and U.S. Patent Application Publication Nos. 2007/0266631 and 2008/0138678. Illustrative, non-exclusive examples of pressure swing adsorption assemblies, including components thereof and methods of operating the same, are disclosed in U.S. Pat. Nos. 3,564,816, 3,986,849, 4,331,455, 5,441,559, 6,497,856, 6,692,545, 7,160,367, 7,393,382, 7,399,342, 7,416,569, 7,837,765, U.S. Patent Application Publication No. 2009/0151249, and U.S. Provisional Patent Application No. 61/287,601, the complete disclosures of which are hereby incorporated by reference.

Chemical purification assembly 56 may include any suitable structure adapted to chemically react the non-hydrogen components of the mixed gas stream. This may include reaction to decrease the concentration of undesirable components of the mixed gas stream and/or reaction to increase the concentration of hydrogen in the mixed gas stream. Illustrative, non-exclusive examples of chemical purification assemblies 56 according to the present disclosure include water-gas-shift reactors and methanation catalyst beds. Illustrative, non-exclusive examples of these chemical purification assemblies are disclosed in the references that are incorporated herein.

Heating assembly 58 may be configured to utilize any suitable structure to supply heat to the components of fuel processing assembly 50 and/or hydrogen-producing fuel processing system 12, such as to heat and/or maintain these components at a suitable elevated temperature for performing their desired function. This may include a burner assembly and/or an electrical heating assembly. When heating assembly 58 includes a burner assembly, it may be referred to as burner assembly 58. Fuel for the burner assembly may be provided by any suitable source. Illustrative, non-exclusive examples of fuels for burner assembly 58 include byproduct stream 53, product hydrogen stream 51, the mixed gas stream, feed stream 22, combined feedstock stream 30, carbon-containing feedstock 24, and/or any other suitable combustible fuel source. When heating assembly 58 includes an electrical heater, it may be referred to as electrical heating assembly 58. Illustrative, non-exclusive examples of sources of electrical energy for electrical heating assembly 58 include energy supplied by a battery or other suitable energy storage device, fuel cell system 62, an electrical power grid, and/or any other suitable source of electrical energy. A fuel processing system 12 may include more than one heating assembly 58.

Optional flow-regulating device 80 may include any suitable structure adapted to regulate the flow rate of product hydrogen stream 51 from fuel processing assembly 50 to hydrogen-consuming/storing device 60. This may include any suitable valve, orifice, pressure regulator, mass flow controller, or other device configured to control, regulate, monitor, and/or meter the flow rate of the mixed gas stream, and is discussed in more detail herein.

Product hydrogen stream 51 may be delivered to any suitable hydrogen-consuming/storing device 60. Illustrative, non-exclusive examples of hydrogen-storage devices according to the present disclosure include any suitable tank, reservoir, pressurized tank, and/or hydride bed. Illustrative, non-exclusive examples of hydrogen-consuming devices according to the present disclosure may include heating assembly 58 and/or chemical processes that may utilize product hydrogen stream 51 as a reactant stream.

Another illustrative, non-exclusive example of hydrogen-consuming/storing device 60 according to the present disclosure includes fuel cell stack 64. A fuel cell stack is a device that produces an electrical potential from a source of protons, such as hydrogen gas, and an oxidant, such as oxygen gas. Accordingly, a fuel cell stack may be adapted to receive at least a portion of product hydrogen stream 51 and a stream of oxygen (which is typically delivered as an air stream), and to produce an electric current therefrom. This is schematically illustrated in FIG. 1, in which a fuel cell stack is indicated at 64 and produces an electric current, or power output, which is schematically illustrated at 66. Fuel cell stack 64 contains at least one, and typically multiple, fuel cells 68 that are adapted to produce an electric current from the oxidant and the portion of the product hydrogen stream 51 delivered thereto. The fuel cells typically are joined together between common end plates 69, which contain fluid delivery/removal conduits, although this construction is not required to all embodiments. Illustrative, non-exclusive examples of suitable fuel cells include proton exchange membrane (PEM) fuel cells, high temperature proton exchange membrane fuel cells, low temperature proton exchange membrane fuel cells, direct methanol fuel cells, alkaline fuel cells, solid oxide fuel cells, phosphoric acid fuel cells, and molten carbonate fuel cells, though other types of fuel cells are also within the scope of the present disclosure.

As discussed in more detail herein, the electric current, or power output, 66 produced by fuel cell stack 64 may be used to satisfy the energy demands, or applied load, of at least one associated energy-consuming device 70. Illustrative, non-exclusive examples of energy-consuming devices 70 include, but should not be limited to, tools, lights or lighting assemblies, appliances (such as household or other appliances), households or other dwellings, offices or other commercial establishments, computers, signaling or communication equipment, etc. Similarly, fuel cell stack 64 may be used to satisfy the power requirements of fuel cell system 62, which may be referred to as the balance-of-plant power requirements of the fuel cell system. Energy-consuming device 70 is schematically illustrated in FIG. 1 and is meant to represent one or more devices, or collection of devices, that are adapted to draw electric current from, or apply an electrical load to, the fuel cell system.

As shown in FIG. 1 and discussed in more detail herein, hydrogen-producing fuel processing systems 12 according to the present disclosure may include a controller 100 that may be adapted or configured to control the operation of at least a portion of the hydrogen-producing fuel processing system. As an illustrative, non-exclusive example, and as shown in dashed lines in FIG. 1, controller 100 may receive status signals 102 indicative of the status of the various components of the hydrogen-producing fuel processing system and may generate control signals 104 to control the operation of the various components of the hydrogen-producing fuel processing system based at least in part on the value of the status signals and/or calculations internal to (i.e., performed by) the controller. This control may be implemented manually by the user, through the use of an electronic controller, or through a combination of the two. The controller may include any suitable type and/or number of devices or mechanisms to implement and provide for the desired monitoring and/or control of hydrogen-producing fuel processing system 12 and/or hydrogen-producing and consuming assembly 10.

As illustrative, non-exclusive examples, a suitable controller may take the form of analog or digital circuitry, together with appropriate electronic instructions that may be stored on magnetic media or programmable memory such as read only memory (ROM), programmable read only memory (PROM), or erasable programmable read only memory (EPROM), and may be integrated into one or more systems or assemblies of hydrogen-producing fuel processing system 12 or be a separate, stand-alone computing device. Illustrative, non-exclusive examples of controllers 100 according to the present disclosure are described in U.S. Pat. Nos. 6,383,670, 6,495,277, 6,811,908, 6,835,481, 6,979,507, 7,208,241, 7,390,587, 7,771,882, 7,842,428, and 7,846,569 as well as in U.S. Patent Application Publication Nos. 2005/0266285 and 2006/0024540, the complete disclosures of which are hereby incorporated by reference.

As discussed in more detail herein, controller 100 may control the operation of at least a portion of hydrogen-producing fuel processing system 12 and/or hydrogen-producing and consuming assembly 10 based at least in part on the status of various components of the hydrogen-producing fuel processing system and/or calculations internal to the controller. Illustrative, non-exclusive examples of status signals 102 include controller 100 receiving status signals indicative of the operational state of the various components of the fuel processing system, as well as the temperature, pressure, concentration, and/or flow rate of the streams contained therein. More specific yet still illustrative, non-exclusive examples include controller 100 receiving status signals 102 indicative of the temperature of the various streams contained within feedstock delivery system 20, the pressure of the various streams contained within the feedstock delivery system, the magnitude of electrical power output 66 from the fuel cell stack, and/or the magnitude of an electrical load applied by energy-consuming device 70.

Illustrative, non-exclusive examples of portions of the hydrogen-producing fuel processing system that may be controlled by controller 100 include any suitable valve, pump, compressor, flow-regulating device, temperature regulating device, electrical energy regulating device, pressure regulating device, and the like. More specific yet still illustrative, non-exclusive examples include controller 100 controlling the flow rate of feed stream 22, such as by controlling the operation of the various pumps, compressors, valves, and/or mass flow controllers included in feedstock delivery system 20; controller 100 controlling the concentration and/or chemical composition of one or more streams associated with hydrogen-producing fuel processing system 12; and/or controller 100 controlling the pressure within the separation assembly.

FIG. 2 provides illustrative, non-exclusive examples of feedstock delivery systems 20 that may be utilized with the systems and methods according to the present disclosure. Feedstock delivery system 20 includes steam delivery system 32, which produces steam stream 29, carbon-containing feedstock delivery system 42, which produces carbon-containing feedstock stream 21, and mixing device 23, which combines the steam stream and the carbon-containing feedstock stream to produced combined feedstock stream 30. The ratio of the flow rate of steam molecules in steam stream 29 to carbon atoms in carbon-containing feedstock stream 21 controls the S/C ratio in the combined feedstock stream that may be supplied to fuel processing assembly 50.

The feedstock delivery system optionally may include steam stream measurement device 110, carbon-containing feedstock stream measurement device 120, and/or combined feedstock stream measurement device 130. Devices 110, 120, and 130 may measure any suitable property of the steam, carbon-containing feedstock, and/or combined feedstock streams, including thermodynamic properties such as temperature and/or pressure. As illustrative, non-exclusive examples, devices 110, 120, and 130 may include a water temperature sensor, a steam temperature sensor 112, a carbon-containing feedstock stream temperature sensor 122, a combined feedstock stream temperature sensor 132, and/or a carbon-containing feedstock stream pressure sensor 124.

Steam delivery system 32 may receive and/or produce steam stream 29 by any suitable mechanism. As an illustrative, non-exclusive example, steam delivery system 32 may include a facilities and/or other suitable source of steam. As another illustrative, non-exclusive example, the steam delivery system may include a water source 33, adapted to supply a water stream 35, and a water flow-regulating device 34, adapted to control the flow rate of the water stream. When water source 33 includes a source of water at a pressure that is higher than that required by the steam delivery system, the water flow-regulating device may include a suitable fixed or variable water pressure regulator 37. When the pressure of the water source is less than that required by the steam delivery system, the water flow-regulating device may include a suitable water pump 38 that is adapted to pressurize, meter, and/or provide a motive force to the water. Water may be supplied from water flow-regulating device 34 to water vaporizer 36, which may vaporize the water stream supplied thereto to produce steam stream 29. The pressure of steam stream 29 may be regulated by steam pressure regulator 39.

Similarly, carbon-containing feedstock delivery system 42 may receive and/or produce a gaseous or vaporous carbon-containing feedstock stream 21 by any suitable mechanism. As an illustrative, non-exclusive example, the carbon-containing feedstock delivery system may include a facilities and/or other suitable source 43 of gaseous and/or vaporous carbon-containing feedstock at a pressure suitable for supply to mixing device 23. As another illustrative, non-exclusive example, carbon-containing feedstock delivery system 42 may include source 43 of gaseous and/or vaporous carbon-containing feedstock, and the carbon-containing feedstock delivery system may further include a carbon-containing feedstock flow-regulating device 44 adapted to control the flow rate and/or pressure of the carbon-containing feedstock stream supplied to mixing device 23. Illustrative, non-exclusive examples of carbon-containing feedstock flow-regulating devices 44 include any suitable carbon-containing feedstock compressor 49, carbon-containing feedstock pressure regulator 40, and/or carbon-containing feedstock mass flow controller 61. As yet another illustrative, non-exclusive example, carbon-containing feedstock source 43 may include a liquid source of carbon-containing feedstock, and carbon-containing feedstock delivery system 42 may further include a carbon-containing feedstock pump 48 adapted to pressurize and supply the carbon-containing feedstock to a carbon-containing feedstock vaporizer 46 to produce gaseous or vaporous carbon-containing feedstock stream 21.

As discussed in more detail herein, controller 100 may receive status signals 102, such as from sensors 112, 122, 124, and/or 132, and may produce control signals 104 that control the operation of at least a portion of the feedstock delivery system based at least in part on the status signals. This may include controlling the operation of steam delivery system 32 and the components contained therein, controlling the operation of carbon-containing feedstock delivery system 42 and the components contained therein, and/or controlling the operation of mixing device 23. As an illustrative, non-exclusive example, controller 100 may determine that the S/C ratio in combined feedstock stream 30 is less than a desired, or target, S/C ratio and may decrease the flow rate of carbon-containing feedstock stream 21, such as by controlling the operation of carbon-containing feedstock flow-regulating device 44, and/or increase the flow rate of steam stream 29, such as by controlling the operation of water flow-regulating device 34, responsive thereto. Similarly, if controller 100 determines that the S/C ratio in combined feedstock stream 30 is greater than a desired level, the controller may increase the flow rate of the carbon-containing feedstock stream and/or decrease the flow rate of the steam stream. As another illustrative, non-exclusive example, if controller 100 determines that the flow rate of combined feedstock stream 30, the flow rate of the mixed gas stream, and/or the flow rate of product hydrogen stream 51 is less than a threshold and/or desired value, the controller may increase the flow rate of both the steam stream and the carbon-containing feedstock stream. This increasing may include increasing the flow rates proportionally to one-another so as to maintain a substantially constant S/C ratio in the combined feedstock stream. Similarly, the controller may decrease the flow rates of the steam stream and the carbon-containing feedstock stream if it is determined that the flow rate of the combined feedstock stream is above a threshold and/or desired value.

Water vaporizer 36 and/or carbon-containing feedstock vaporizer 46 may include any suitable device that is adapted to accept a liquid stream and vaporize or evaporate the liquid stream to produce a gaseous and/or vaporous product stream. Illustrative, non-exclusive examples of vaporizers according to the present disclosure may include a boiler or any other structure that may utilize heat energy from electrical and/or combustion heaters to supply the latent heat necessary to transition at least a portion of the liquid stream contained therein from its liquid state to its gaseous or vaporous state.

Mixing device 23 may include any suitable structure that is adapted to combine steam stream 29 with carbon-containing feedstock stream 21 to produce combined stream 30. Mixing device 23 may further include thermal insulation 18 that is adapted to decrease the exchange of thermal energy between the streams internal to mixing device 23 and the environment external to the mixing device. Whether or not mixing device 23 includes thermal insulation 18, the mixing device may be designed so that the streams are combined therein in an at least substantially adiabatic and/or an at least substantially isenthalpic fashion.

Illustrative, non-exclusive examples of mixing devices 23 according to the present disclosure may include a mixing volume 25, within which the steam stream and the carbon-containing feedstock streams may be combined. Such a mixing volume may include baffles or other structures adapted to encourage complete, or nearly complete, mixing of the streams supplied thereto. As illustrative, non-exclusive examples, this may be accomplished by flowing the streams along a lengthy and/or tortuous flow path, providing turbulent flow of the streams, and/or entraining one stream in another. In addition, mixing volumes may not control and/or regulate the mixing ratio of the streams supplied thereto and instead may rely upon the supplied flow rate of the streams to control the mixing ratio.

Another illustrative, non-exclusive example of mixing devices 23 according to the present disclosure may include any suitable structure that is adapted to blend, mix, agitate, and/or provide a motive force to the streams supplied thereto to increase the potential for complete, or nearly complete, and uniform mixing of the streams. This may include mixing devices 23 that may utilize mechanical mixing structures, as well as mixing devices that may utilize pressure differentials, turbulence, and/or stream velocity differentials to improve mixing. An illustrative, non-exclusive example of a mixing device 23 according to the present disclosure that may utilize pressure differentials to both provide a motive force to one of the fluid streams and encourage complete mixing of the fluid streams supplied thereto includes a velocity pump 27. When utilized, a velocity pump may employ a venturi, orifice, or other suitable structure to induce a velocity increase in a primary, or motive, fluid and to utilize the low pressure created by the velocity increase to pump and/or entrain another secondary, or entrained, fluid within the primary fluid. Illustrative, non-exclusive examples of velocity pumps according to the present disclosure include an injector pump, an ejector pump, a steam ejector, a steam injector, a thermocompressor, an eductor pump, a jet pump, an aspirator, and/or a venturi pump.

As discussed in more detail herein, the disclosed systems and methods may be configured to monitor a thermodynamic property of at least one of the water or steam stream, the carbon-containing feedstock stream, and/or the combined feedstock stream and control the S/C ratio of the combined feedstock stream based at least in part on the monitored thermodynamic property or properties. These systems and methods may include temperature-based systems and methods that may utilize temperature measurements to control the S/C ratio, as well as pressure-based systems and methods that may utilize pressure measurements and/or pressure control to control the S/C ratio.

Schematic, illustrative, non-exclusive examples of a temperature-based system for controlling the S/C ratio of the combined feedstock stream are shown in FIG. 3. Therein, hydrogen-producing fuel processing system 12 includes steam delivery system 32 and carbon-containing feedstock delivery system 42, which may be configured to supply steam stream 29 and carbon-containing feedstock stream 21, respectively, to mixing device 23, such as mixing volume 25, to produce combined feedstock stream 30. Fuel processing assembly 50 receives the combined feedstock stream and produces product hydrogen stream 51 therefrom. Fuel processing system 12 may optionally include hydrogen-consuming/storing device 60 and/or energy-consuming device 70, as discussed in more detail herein.

The illustrated hydrogen-producing fuel processing system further includes controller 100, which includes a temperature-based controller 150. Temperature-based controller 150 which may receive status signals 102, including steam stream temperature signal 114 from steam stream temperature sensor 112, carbon-containing feedstock stream temperature signal 126 from carbon-containing feedstock stream temperature sensor 122, and combined feedstock stream temperature signal 134 from combined feedstock stream temperature sensor 132, and control the operation of at least a portion of feedstock delivery system 20 based thereon. Controller 100 also may receive status signals 102 from fuel processing assembly 50, hydrogen-consuming/storing device 60, and/or energy-consuming device 70.

As an illustrative, non-exclusive example, temperature-based controller 150 may utilize a feedforward control methodology to calculate a desired flow rate of steam stream 29 and a desired flow rate of carbon-containing feedstock stream 21 based at least in part on a desired S/C ratio in combined feedstock stream 30 and a desired flow rate of product hydrogen stream 51. The desired flow rate of the product hydrogen stream may be based on any suitable parameter, illustrative, non-exclusive examples of which include a demand for the product hydrogen stream by hydrogen consuming/storing device 60, such as fuel cell stack 64, an electrical current output from fuel cell stack 64, and/or a demand for electrical power by energy-consuming device 70.

In the illustrative example, receipt of a signal indicative of an increase in the demand for product hydrogen stream 51, an increase in the electrical current output from fuel cell stack 64, and/or an increase in the demand for electrical power by energy-consuming device 70 may cause controller 100 to increase the flow rate of both the steam stream and the carbon-containing feedstock stream, leading to a subsequent increase in the flow rates of both the combined feedstock stream and the product hydrogen stream. Similarly, receipt of a signal indicative of a decrease in the demand for the product hydrogen stream, a decrease in the electrical power output from the fuel cell stack, and/or a decrease in the demand for electrical power by energy-consuming device 70 may cause temperature-based controller 150 to decrease the flow rate of both the steam stream and the carbon-containing feedstock stream, leading to a subsequent decrease in the flow rates of both the combined feedstock stream and the product hydrogen stream. Expressed in slightly different terms, the temperature-based controller may be configured to perform the recited functions, or actions, responsive at least in part to the receipt, or detection, of the corresponding signal, input, etc.

As discussed in more detail herein, increasing and/or decreasing the flow rate of the steam stream and the carbon-containing feedstock stream may include a proportionate increase or decrease in the flow rate of both streams such that the S/C ratio in the combined feedstock stream is maintained substantially constant and equal to the desired value. As an illustrative, non-exclusive example, if temperature-based controller 150 determines that the flow rate of the combined feedstock stream should be reduced to 80% of its current value, the flow rates of both the steam stream and the carbon-containing feedstock stream may be reduced to approximately 80% of their current value.

As another illustrative, non-exclusive example, temperature-based controller 150 may utilize a feedback control methodology to correct the current flow rate of the steam stream and/or the carbon-containing feedstock stream to maintain the S/C ratio at or within an acceptable and/or desired value or range of values. This may include calculating the current S/C ratio based at least in part on the temperatures of the steam stream, the carbon-containing feedstock stream, and/or the combined feedstock stream, and adjusting the flow rate of at least one of the steam stream and the carbon-containing feedstock stream based at least in part on the calculated S/C ratio and the desired S/C ratio.

Figure 4:
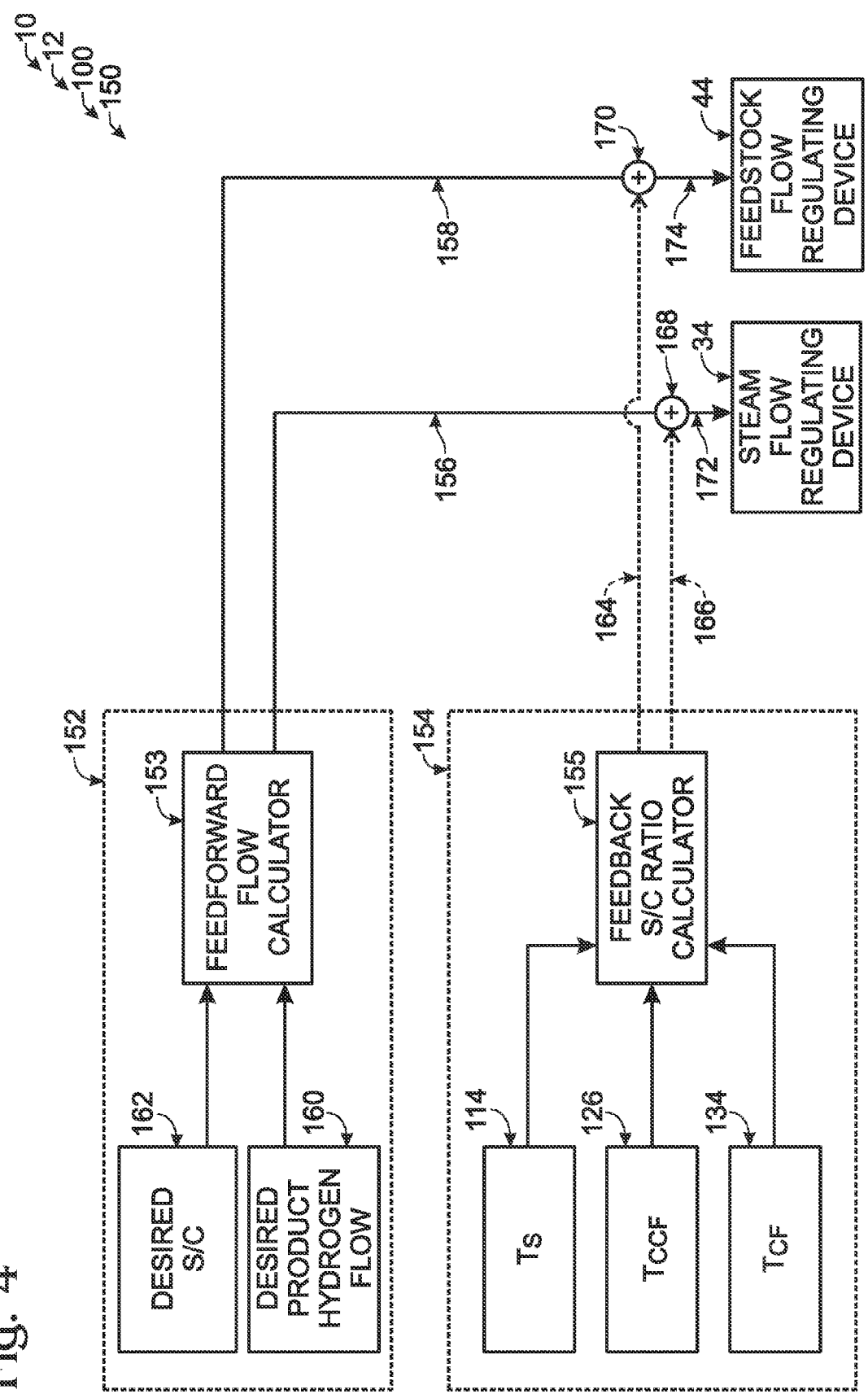
FIG. 4 is a schematic representation of illustrative, non-exclusive examples of temperature-based steam-to-carbon ratio controllers according to the present disclosure.

FIG. 4 provides a schematic representation of an illustrative, non-exclusive example a temperature-based controller 150 that may be utilized with the temperature-based S/C ratio control system of FIG. 3. The controller of FIG. 4 is a predictor-corrector control system that includes a feedforward control portion 152, including feedforward flow calculator 153, that may calculate a desired flow rate for the steam stream 156 and a desired flow rate for the carbon-containing feedstock stream 158 based at least in part on the desired flow rate of the product hydrogen stream 160 and the desired S/C ratio in the combined feedstock stream 162.

The controller of FIG. 4 further includes a feedback control portion 154, including feedback S/C ratio calculator 155, that may correct (i.e., increase, decrease, or otherwise adjust) the desired flow rate of at least one of the steam stream and the carbon-containing feedstock stream by supplying a steam stream flow rate correction signal 164 and/or a carbon-containing feedstock stream flow rate correction signal 166 to summing blocks 168 and/or 170, respectively, to generate corrected steam stream flow rate signal 172 and/or corrected carbon-containing feedstock stream flow rate signal 174. The corrected steam stream flow rate signal and the corrected carbon-containing feedstock stream flow rate signal may be supplied to steam stream flow-regulating device 34 and carbon-containing feedstock flow-regulating device 44, respectively, to control the operation thereof. The value of the steam stream flow rate correction signal and/or the value of the carbon-containing feedstock flow rate correction signal may be determined based at least in part on the steam stream temperature signal 114, the carbon-containing feedstock stream temperature signal 126, and/or the combined feedstock stream temperature signal 134.

Feedforward flow calculator 153 of the temperature-based S/C ratio controller of FIG. 4 may utilize any suitable structure, algorithm, and/or logic to predict the desired flow rates of the steam and carbon-containing feedstock streams based at least in part on the desired S/C ratio in the combined feedstock stream and the desired flow rate of the product hydrogen stream. As an illustrative, non-exclusive example, feedforward flow calculator 153 may utilize a lookup table or other database to determine the desired flow rates. As another illustrative, non-exclusive example, feedforward flow calculator 153 may utilize a mathematical function or algorithm to calculate the desired flow rates. As yet another illustrative, non-exclusive example, feedforward calculator 153 may utilize a mechanical assembly adapted to generate the desired flow rates and/or control to the desired flow rates. As yet another illustrative, non-exclusive example, the flow rate of the steam stream as a function of the pumping speed of the water flow-regulating device, together with the flow rate of the carbon-containing feedstock as a function of the pumping speed of the carbon-containing feedstock flow-regulating device may be predetermined and temperature-based controller 150 may be configured to request, select, or otherwise command, a specific pumping speed from both the water flow-regulating device and the carbon-containing feedstock flow-regulating device based at least in part on the desired steam stream flow rate and desired carbon-containing feedstock stream flow rate signals, respectively.

Similarly, feedback S/C ratio calculator 155 may utilize any suitable structure, algorithm, and/or logic to correct the desired flow rates obtained by the feedforward control portion based at least in part on the temperatures of the steam stream, the carbon-containing feedstock stream, and/or the combined feedstock stream. As an illustrative, non-exclusive example, a thermal energy balance may be utilized to calculate the actual S/C ratio in the combined feedstock stream based on these measured temperatures. Assuming that the mixing process is isenthalpic (i.e., no energy transfer between the streams and their surroundings, no work done on or by the streams, and no change in the kinetic energy of the streams), the heat capacities of the steam and the carbon-containing feedstock streams are a linear function of temperature, and ideal gas behavior, a thermal energy balance on the three streams yields:

$$\frac{S}{C} = \frac{\left[\frac{a_{CCF}}{2}(T_{CF}^2 - T_{CCF}^2) + b_{CCF}(T_{CF} - T_{CCF})\right]}{\left[\frac{a_S}{2}(T_S^2 - T_{CF}^2) + b_S(T_S - T_{CF})\right]x} \quad (1)$$

Where S/C is the S/C ratio of the combined feedstock stream, $a_{CCF}$ and $b_{CCF}$ are the coefficients of the heat capacity relationship $C_{p,CCF} = a_{CCF}*T + b_{CCF}$ for the carbon-containing feedstock stream, $a_s$ and $b_s$ are the coefficients of the heat capacity relationship $C_{p,S} = a_S*T + b_S$ for the steam stream, $T_{CCF}$ is the temperature of the carbon-containing feedstock stream, $T_S$ is the temperature of the steam stream, $T_{CF}$ is the temperature of the combined feedstock stream, and x is the average number of carbon atoms per molecule in the carbon-containing feedstock.

Illustrative, non-exclusive examples of the coefficients $a_{CCF}$, $b_{CCF}$, $a_S$, and $b_S$ for steam and several representative carbon-containing feedstock streams over a temperature range of 400 to 700° C. and at a pressure of 100 psig are shown in Table 1. Coefficients for other carbon-containing feedstocks and/or at different pressures or over different temperature ranges may be readily determined from standard thermodynamic tables and/or calculated utilizing standard thermodynamic techniques.

TABLE 1

|  | $a_i$ | $b_i$ | x |
| --- | --- | --- | --- |
| Steam | 0.011 | 33.381 | N/A |
| Methane | 0.0535 | 34.493 | 1 |
| Natural Gas | 0.0577 | 36.715 | ~1.05-1.15 |
| 80% Methane, 15% Ethane, and 5% Propane | 0.0709 | 41.684 | 1.25 |

Thus, the S/C ratio of the combined feedstock stream may be calculated using equation (1) once the temperatures of the steam, carbon-containing feedstock, and combined feedstock streams are known. It is within the scope of the present disclosure that other relationships may be utilized to calculate the S/C ratio of the combined stream based on the temperatures of the steam, carbon-containing feedstock, and combined feedstock streams. These may include thermodynamically based relationships that include fewer, more, and/or different assumptions than those utilized to arrive at equation (1), as well as relationships based partially and/or solely on empirical observation of system performance and may include mathematical relationships as well as tables, databases, and/or lookup tables.

As an illustrative, non-exclusive example, the heat of mixing associated with combining the steam stream and the carbon-containing feedstock stream may be assumed to be non-zero and a mathematical relationship that includes the impact of the heat of mixing may be derived. As another illustrative, non-exclusive example, the variation in the heat capacities of the steam and the carbon-containing feedstock as a function of temperature may be assumed to be nonlinear, and a mathematical relationship that includes the impact of this nonlinear behavior may be derived. As yet another illustrative, non-exclusive example, the mixing process may not be assumed to be isenthalpic, and a mathematical relationship that includes the impact of this non-isenthalpic behavior may be derived. As yet another illustrative, non-exclusive example, an empirical correction factor may be added to any of the above relationships.

Figure 5:
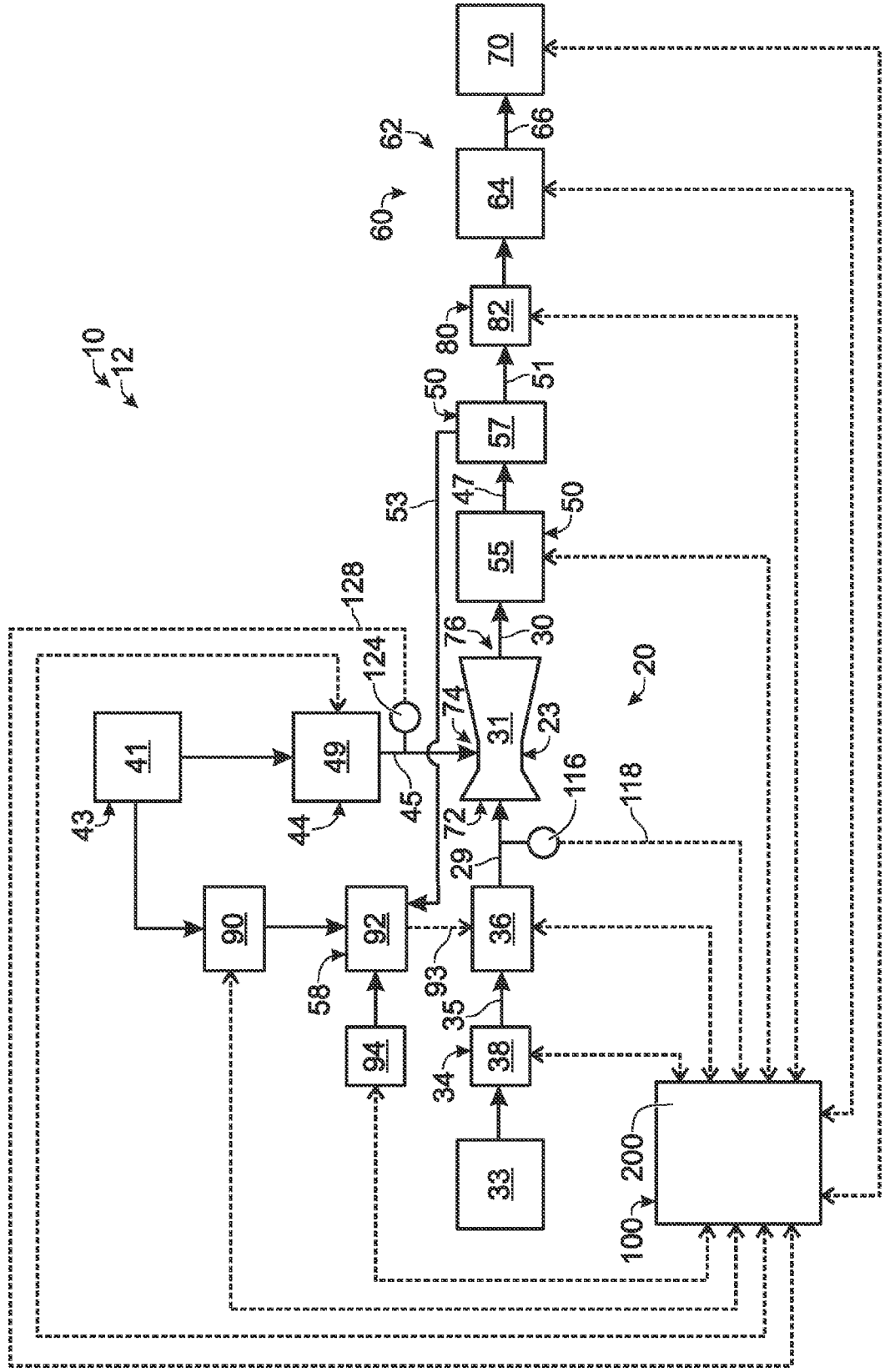
FIG. 5 is a schematic representation of illustrative, non-exclusive examples of reactant delivery systems that may utilize pressure-based S/C ratio control according to the present disclosure.

A schematic, illustrative, non-exclusive example of a pressure-based system for controlling the S/C ratio of the combined feedstock stream is shown in FIG. 5. Therein, water pump 38 supplies a water stream 35 from water source 33 to water vaporizer 36, which vaporizes the water to produce steam stream 29, which is supplied to a primary inlet 72 of a venturi 31. In addition, a natural gas stream 45 from a natural gas source 41 is supplied by carbon-containing feedstock compressor 49 to a secondary inlet 74 of the venturi. The steam and natural gas streams are combined within the venturi to form combined feedstock stream 30, which is supplied to steam reformer 55, to produce a mixed gas stream 47 therefrom. The mixed gas stream is supplied to pressure swing adsorption assembly 57, which separates the mixed gas stream into product hydrogen stream 51 and byproduct stream 53. The product hydrogen stream is supplied to back pressure regulator 82, which maintains a constant pressure upstream from the back pressure regulator. The product hydrogen stream exiting the back pressure regulator is supplied to fuel cell stack 64, which produces electrical power output 66 therefrom. The electrical power output may be used to satisfy at least a portion of an applied load from energy-consuming device 70.

Combustion heater 92 may receive oxidant from air blower 94 and fuel from byproduct stream 53 and/or directly from natural gas source 41 (such as via an optional variable orifice 90) and may produce heated exhaust stream 93 therefrom. Thermal energy from the heated exhaust stream may be utilized to heat water vaporizer 36 such as to provide at least a portion, if not all, of the thermal energy required to vaporize the water delivered thereto in water stream 35. It is also within the scope of the present disclosure that the heated exhaust stream additionally or alternatively may supply thermal energy to steam reformer 55 and/or that combustion heater 92 may include a plurality of combustion heaters, such as separate combustion heaters to heat water vaporizer 36 and steam reformer 55.

Venturi 31 may utilize the flow of fluid entering primary inlet 72 and the venturi effect to generate a vacuum at secondary inlet 74. The magnitude of the vacuum generated at secondary inlet 74 may vary with such illustrative, non-exclusive factors as the design of the venturi, the flow rate of the fluid entering primary inlet 72, the pressure drop between primary inlet 72 and outlet 76, and/or the age and/or operating conditions of venturi 31. When hydrogen producing fuel processing system 12 includes back pressure regulator 82, the pressure at venturi outlet 76 may be constant (or at least substantially constant), and thus the pressure drop across the venturi may be proportional to the pressure at primary inlet 72.

It is within the scope of the present disclosure that the magnitude of the vacuum generated at secondary inlet 74 may be assumed to be a fixed, linear function of the flow rate of the fluid entering primary inlet 72. However, it is also within the scope of the present disclosure that the magnitude of the vacuum generated at the secondary inlet may be assumed to be a nonlinear function of the flow rate of the fluid entering the primary inlet and may be a fixed function or a calibrated function that may vary with the age and/or operating conditions of the venturi.

The flow rate of the natural gas stream entering the secondary inlet of venturi 31 may be assumed to be proportional to the vacuum generated at secondary inlet 74 and the pressure of the natural gas stream entering the secondary inlet. As used herein, the pressure of the natural gas stream entering the secondary inlet also may be referred to as the natural gas supply pressure and may include any parameter representative of or associated with the natural gas pressure prior to entering venturi 31 such as, for example, the pressure monitored by carbon-containing feedstock stream pressure sensor 124.

As an illustrative, non-exclusive example, when the magnitude of the vacuum generated at secondary inlet 74 is a linear function of the flow rate of the steam stream entering the primary inlet, the S/C ratio in the combined stream generated within the venturi may be assumed to be approximately constant if the natural gas supply pressure is maintained constant. Thus, a constant S/C ratio may be maintained by maintaining a constant natural gas supply pressure, regardless of the magnitude of the flow rates of the steam stream, the natural gas stream, and the combined feedstock stream.

As another illustrative, non-exclusive example, when the magnitude of the vacuum generated at the secondary inlet is a linear function of the flow rate of the steam stream entering the primary inlet, the S/C ratio in the combined stream generated within the venturi may be assumed to be proportional to the natural gas supply pressure. Thus, the S/C ratio may be varied and/or controlled by varying the natural gas supply pressure. If an increase in the S/C ratio is desired, the natural gas supply pressure may be increased. Similarly, if a decrease in the S/C ratio is desired, the natural gas supply pressure may be decreased. This may include increasing and/or decreasing the natural gas supply pressure based on a mathematical function, lookup table, database, and/or any other suitable method of determining the natural gas supply pressure needed to provide the desired S/C ratio within the combined feedstock stream.

As discussed in more detail herein, it is also within the scope of the present disclosure that the vacuum generated at secondary inlet 74 of venturi 31 is a nonlinear function of the flow rate of the steam stream entering primary inlet 72 and/or the pressure drop across the venturi. Under these conditions, maintaining the natural gas supply pressure at a constant value may not provide a constant S/C ratio in the combined feedstock stream. Thus, it is within the scope of the present disclosure that the natural gas supply pressure may be varied based not only on a desired S/C ratio, but also based at least in part on a variable associated with the flow rate of the steam stream through the venturi. By "associated with," it is meant that a variable may be indicative of, representative of, and/or a function of the parameter with which it is associated. Illustrative, non-exclusive examples of variables associated with the flow rate of the steam stream include the flow rate of the water stream, the pumping speed of water pump 38, the flow rate of the steam stream, the pressure of the steam stream at the primary inlet to the venturi (such as may be measured by steam stream pressure sensor 116), the magnitude of the electrical current produced by fuel cell stack 64, and/or the magnitude of the electrical load applied by energy-consuming device 70. This may include the use of any suitable algorithm, formula, look up table, and/or database to determine the natural gas supply pressure based at least in part on the variable associated with the flow rate of the steam stream through the venturi.

Controller 100, including pressure-based controller 200, may control a portion and/or all of hydrogen producing and consuming assembly 10, such as hydrogen-producing fuel processing system 12, feedstock delivery system 20, and/or fuel cell system 62. As an illustrative, non-exclusive example, controller 100 may utilize a feedback control methodology to control the temperature of water vaporizer 36 such as by controlling the rate of production of heated exhaust stream 93 by combustion heater 92. As illustrative, non-exclusive examples, this may be accomplished by controlling air blower 94 to control the flow rate of air to the combustion heater and/or by controlling variable orifice 90 to control the flow rate of natural gas to the combustion heater, which may be utilized to supplement and/or in place of the flow of byproduct stream 53 to the combustion heater. Thus, if the temperature of the water vaporizer is lower than a threshold temperature, controller 100 may increase the orifice size in variable orifice 90 and increase the supply of natural gas to the combustion heater. Similarly, if the temperature of the water vaporizer is higher than a threshold temperature, controller 100 may decrease the orifice size in variable orifice 90, thereby decreasing the supply of natural gas to the combustion heater.

As another illustrative, non-exclusive example, the natural gas supply pressure may be detected by carbon-containing feedstock stream pressure sensor 124, which may supply natural gas stream pressure signal 128 to pressure-based controller 200. Pressure-based controller 200 may be configured to determine a desired natural gas supply pressure and to control the operation of carbon-containing feedstock compressor 49 (which in this case may be referred to as a natural gas compressor) to maintain the desired natural gas supply pressure.

As an illustrative, non-exclusive example, and as discussed in more detail herein, the natural gas supply pressure may be controlled to a fixed value based at least in part on the design of the venturi and the desired S/C ratio. As another illustrative, non-exclusive example, the natural gas supply pressure may vary based at least in part on the variable associated with the flow rate of the steam stream, an illustrative, non-exclusive example of which includes the steam stream pressure as measured by steam stream pressure sensor 116 and supplied to controller 200 as steam stream pressure signal 118. This may include increasing the natural gas supply pressure with increasing steam stream flow rates and decreasing the natural gas supply pressure with decreasing steam stream flow rates, as well as decreasing the natural gas supply pressure with increasing steam stream flow rates and increasing the natural gas supply pressure with increasing steam stream flow rates. The actual relationship between the natural gas supply pressure and the variable associated with the steam stream flow rate may be determined based at least in part on the variation in the vacuum generated at secondary inlet 74 as a function of the variable associated with the steam stream flow rate and may include any suitable relationship between the variables, as discussed in more detail herein.

Controller 200 also may utilize a feedforward control strategy to control the flow rate of the heated exhaust stream to the water vaporizer based at least in part on the flow rate of water stream 35 supplied by water pump 38 to the water vaporizer. If the water stream flow rate is increased, the controller may increase the supply of fuel to the combustion heater. Similarly, if the water stream flow rate is decreased, the controller may decrease the supply of fuel to the combustion heater. As another illustrative, non-exclusive example, pressure-based controller 200 may utilize a feedforward control methodology to control the flow rate of steam stream 29 that is supplied to the primary inlet of venturi 31 based at least in part on a desired flow rate of mixed gas stream 47 and/or product hydrogen stream 51, on a desired magnitude of electrical power output 66 from fuel cell stack 64, and/or on a magnitude of an electrical load applied by energy-consuming device 70.

Figure 6:
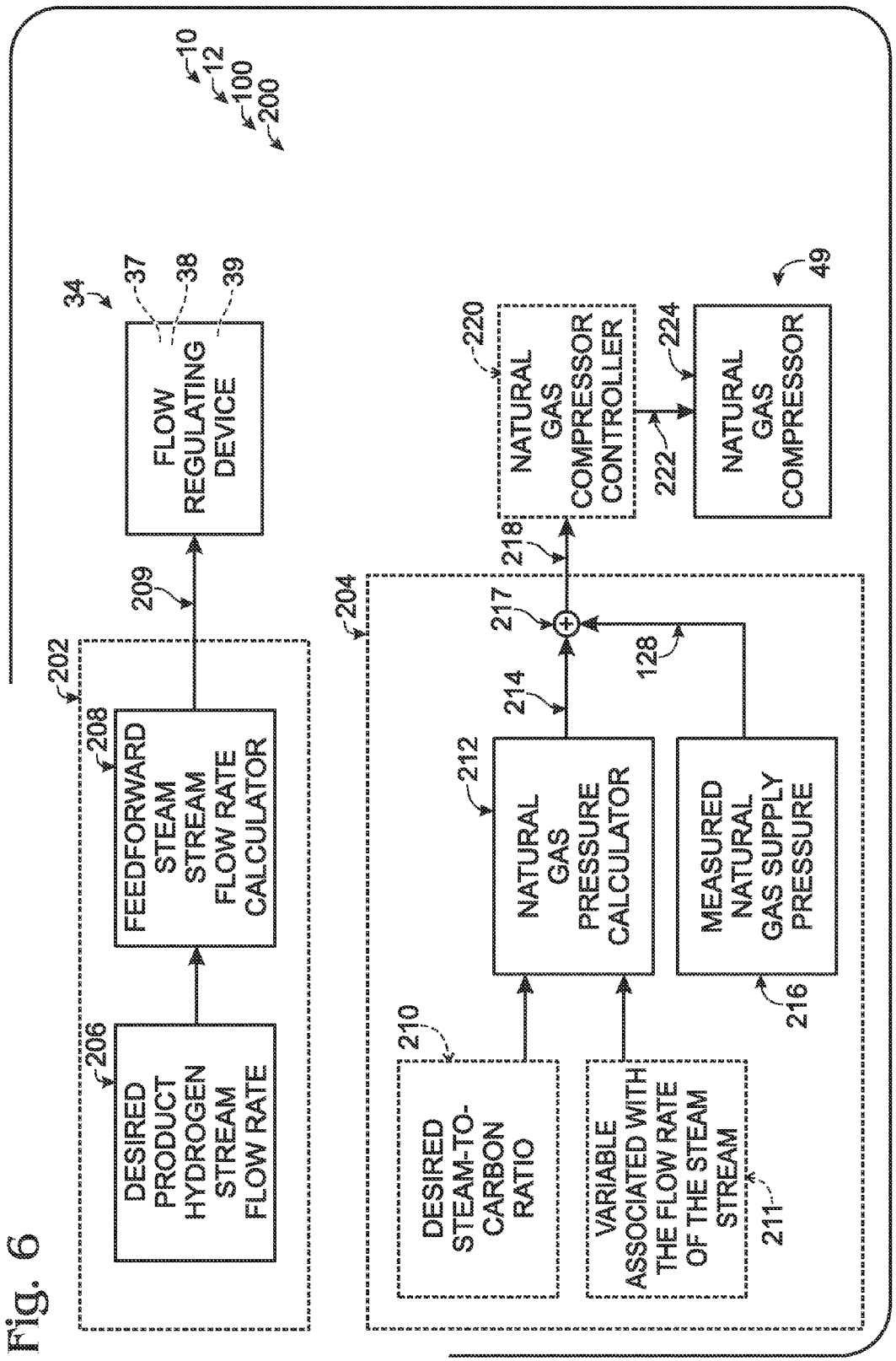
FIG. 6 is a schematic representation of illustrative, non-exclusive examples of pressure-based steam-to-carbon ratio controllers according to the present disclosure.

In FIG. 6, an illustrative, non-exclusive example of pressure-based controller 200 that may be utilized with the pressure-based S/C ratio control systems according to the present disclosure, such as the systems of FIG. 5, is shown. Pressure-based controller 200 may include feedforward portion 202, which may be configured to calculate a desired flow rate for the steam stream based at least in part on a desired flow rate of the product hydrogen stream, and feedback portion 204, which may be configured to control the operation of carbon-containing feedstock compressor 49 based at least in part on a desired S/C ratio, a measured natural gas supply pressure, and/or a variable associated with the flow rate of the steam stream.

A desired product hydrogen stream flow rate signal 206 is supplied to feedforward steam stream flow rate calculator 208 of feedforward portion 202. Based at least in part on the desired product hydrogen stream flow rate, the feedforward steam flow rate calculator determines a desired steam stream flow rate 209 that may be supplied to water flow-regulating device 34, such as to water pressure regulator 37, water pump 38, and/or steam pressure regulator 39, to regulate the flow rate of steam stream 29 to venturi 31.

As discussed in more detail herein, the desired product hydrogen stream flow rate may be determined using any suitable method and/or criteria. Illustrative, non-exclusive examples include a user-supplied product hydrogen stream flow rate, a product hydrogen stream flow rate demand signal, such as may be generated by hydrogen consuming/storing device 60 and/or fuel cell system 62, the electrical current output from fuel cell stack 64, and/or a demand for electrical current output from the fuel cell stack.

Feedforward steam stream flow rate calculator 208 may be configured to calculate the desired flow rate of the steam stream to venturi 31 based at least in part on desired product hydrogen stream flow rate 206 using any suitable criteria. As an illustrative, non-exclusive example, this may include calculations based at least in part on the stoichiometry of the chemical reaction performed within hydrogen-producing region 52, the desired S/C ratio in the combined feedstock stream that is supplied to the hydrogen-producing region, and/or the efficiency of the hydrogen-producing region in producing the mixed gas stream from the combined feedstock stream.

Water flow-regulating device 34 may be configured to respond to desired steam stream flow rate signal 209 by supplying a water stream flow rate that will produce the desired steam stream flow rate. As an illustrative, non-exclusive example, water flow-regulating device 34 may include, and/or be configured to operate at and/or provide, a range of pumping speeds and/or pressure states and/or settings, depending on the nature of the flow-regulating device. In addition, the flow rate of the steam stream that may be generated by a specific pumping speed and/or state of the water flow-regulating device may be calibrated or otherwise determined such that, when the water flow-regulating device receives the desired steam stream flow rate signal, it may be configured to transition to the state and/or pumping speed that may provide the desired steam stream flow rate.

Pressure-based feedback control portion 204 optionally may receive a desired S/C ratio at 210 and to supply a signal indicative of the desired S/C ratio to natural gas pressure calculator 212. The pressure-based feedback control portion further optionally may be configured to receive a value of a variable associated with the flow rate of the steam stream 211 and to supply a signal representative of the flow rate of the steam stream to the natural gas pressure calculator. Based on the desired S/C ratio, the flow rate of the steam stream, and/or a predetermined desired natural gas pressure, natural gas pressure calculator 212 may be configured to generate a desired natural gas pressure signal 214 and to supply the desired natural gas pressure signal to summing block 217.

In addition, pressure-based feedback control portion 204 may be configured to determine the actual natural gas supply pressure at 216 and to supply actual natural gas supply pressure signal 128 to summing block 217. Summing block 217 compares the desired natural gas pressure signal to the actual natural gas supply pressure signal and generates natural gas supply pressure error signal 218. The natural gas supply pressure error signal may be supplied to natural gas compressor controller 220, which may generate a natural gas compressor drive signal 222 that may be supplied to natural gas compressor 224 to control the operation of the natural gas compressor and thus the natural gas supply pressure.

As discussed in more detail herein, it is within the scope of the present disclosure that the desired natural gas supply pressure may be a constant and/or predetermined value that does not change during operation of the hydrogen-producing fuel processing assembly and is based solely on the construction of the venturi and the desired S/C ratio (which may be a fixed value). Under these conditions, pressure-based feedback control portion 204 may control the natural gas compressor such that the natural gas supply pressure remains substantially constant regardless of the flow rate of the steam, natural gas, and/or combined feedstock streams.

However, and as discussed in more detail herein, it is also within the scope of the present disclosure that the desired natural gas supply pressure may be varied during operation of the hydrogen-producing fuel processing assembly. As an illustrative, non-exclusive example, the desired natural gas supply pressure may be varied based at least in part on changes in the desired S/C ratio. This may include increasing the desired natural gas supply pressure when the desired S/C ratio is increased, as well as decreasing the desired natural gas supply pressure when the desired S/C ratio is decreased. The desired S/C ratio may vary based on a variety parameters, illustrative, non-exclusive examples of which include the operational state of the hydrogen-producing fuel processing system and/or the quality and/or chemical composition of the carbon-containing feedstock.

As another illustrative, non-exclusive example, the desired natural gas supply pressure may be varied in a systematic fashion in order to compensate for nonlinearity in the functional form of the vacuum developed at the secondary inlet to the venturi with respect to the flow rate of the steam stream through the venturi in order to maintain a substantially constant S/C ratio over a wide range of combined feedstock stream flow rates. This may include increasing the natural gas supply pressure when the vacuum generated at the secondary inlet to the venturi is less than the vacuum that might be expected for a linear vacuum magnitude vs. steam stream flow rate relationship, and/or as decreasing the natural gas supply pressure when the vacuum generated at the secondary inlet to the venturi is greater than the vacuum that might be expected for a linear vacuum magnitude vs. steam stream flow rate relationship.

Figure 7:
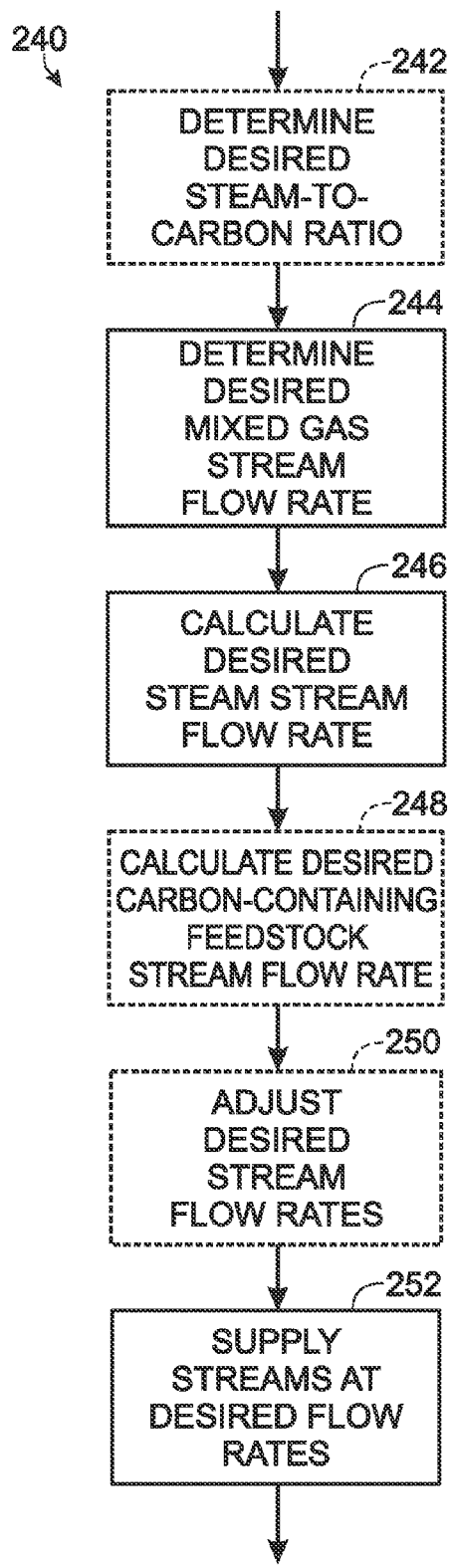
FIG. 7 is a flow chart showing illustrative, non-exclusive examples of feedforward control methods according to the present disclosure.
Figure 9:
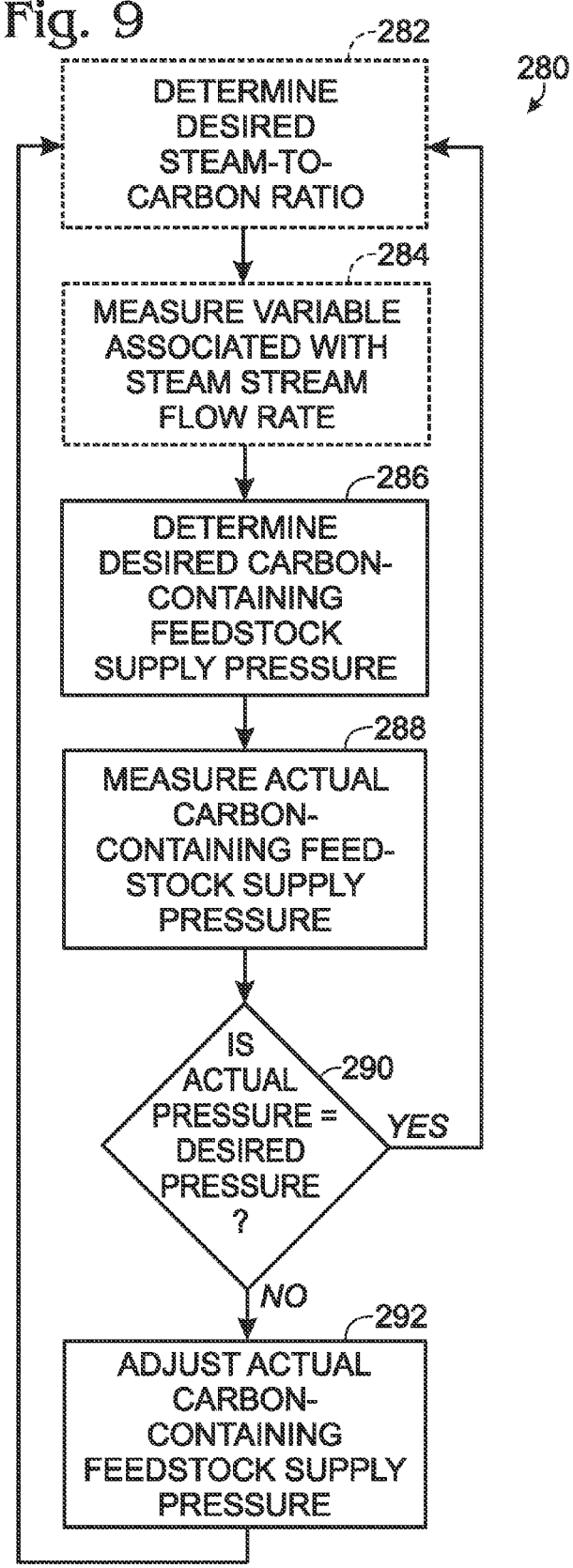
FIG. 9 is a flow chart showing an illustrative, non-exclusive example of pressure-based feedback control methods according to the present disclosure.
Figure 8:
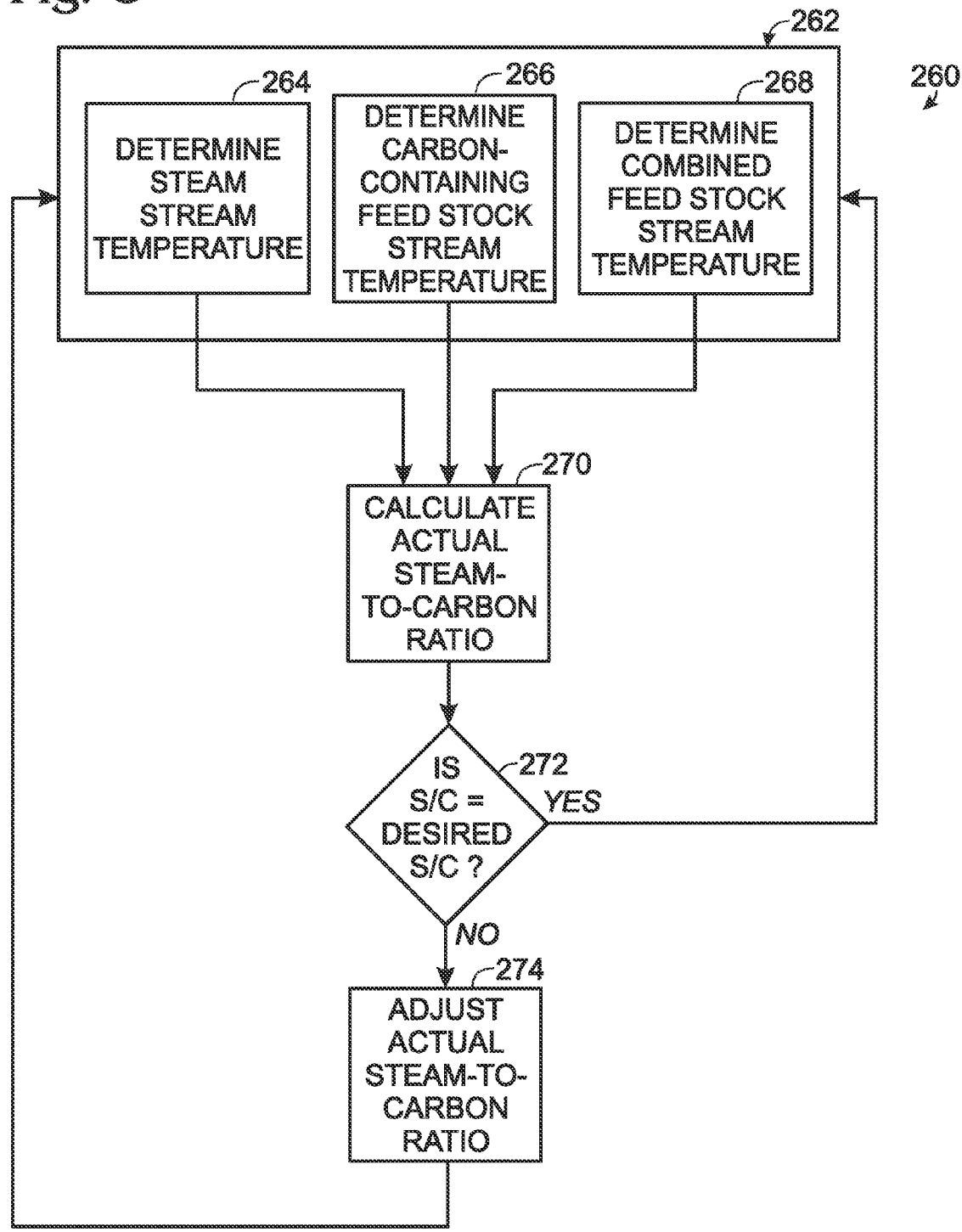
FIG. 8 is a flow chart showing illustrative, non-exclusive examples of temperature-based feedback control methods according to the present disclosure.

FIGS. 7-9 are flowcharts providing illustrative, non-exclusive examples of methods for actively controlling the S/C ratio in hydrogen-producing fuel processing systems according to the present disclosure. As discussed in more detail herein, these methods may include feedforward control portions and/or feedback control portions that may be utilized independently and/or in tandem. When utilized in tandem (i.e., together), the feedforward and feedback control portions may form predictor-corrector-type control strategies, as well as control strategies that utilize feedforward and feedback control strategies to independently control various aspects of the hydrogen-producing fuel processing system.

FIG. 7 is a flow chart providing illustrative, non-exclusive examples of feedforward control methods 240 that may be utilized to control the flow rate of the steam stream, and optionally the carbon-containing feedstock stream, and may be applicable to both the temperature-based and the pressure-based control strategies disclosed herein. The methods of FIG. 7 may optionally include determining a desired S/C ratio in the combined feedstock stream at step 242 and determining a desired mixed gas stream flow rate at step 244. The methods then calculate a desired steam stream flow rate at step 246 and optionally calculate a desired carbon-containing feedstock stream flow rate at step 248 before transitioning to optional step 250, wherein the desired steam and/or carbon-containing feedstock stream flow rates may be adjusted before the steam, and optionally carbon-containing feedstock stream(s), are supplied at the desired flow rates at step 252.

Determining the desired S/C ratio at step 242 and/or determining the desired mixed gas stream flow rate at step 244, as well as calculating the desired steam stream flow rate at step 246 and/or calculating the desired carbon-containing feedstock stream flow rate at step 248 may be accomplished in any suitable manner, including those discussed in more detail herein. Adjusting the steam and/or carbon-containing feedstock stream flow rates at step 250 may include adjusting the flow rates based on any suitable criteria, an illustrative, non-exclusive example of which includes adjusting the flow rates based at least in part on a feedback control strategy, such as those described in more detail herein. Supplying the steam and the carbon-containing feedstock streams at the desired flow rates at step 252 may include actively supplying both feeds streams, such as by controlling water flow-regulating device 34 and/or carbon-containing feedstock flow-regulating device 44, as well as actively supplying at least a first stream and passively supplying the second stream, such as through the use of venturi 31.

FIG. 8 is a flow chart providing an illustrative, non-exclusive example of a temperature-based feedback control method 260 according to the present disclosure that may be utilized to adjust the flow rate of the steam stream and/or the carbon-containing feedstock stream to control the S/C ratio in the combined feedstock stream to a desired or target value based at least in part on the temperature of the steam stream, the temperature of the carbon-containing feedstock stream, and the temperature of the combined feedstock stream. The method includes determining the stream temperatures at step 262, which includes determining the steam stream temperature at step 264, determining the carbon-containing feedstock stream temperature at step 266, and determining the combined feedstock stream temperature at step 268. The method then transitions to step 270, wherein the actual S/C ratio in the combined feedstock stream is calculated based at least in part on the stream temperatures. At comparison step 272, the actual S/C ratio is compared to the desired S/C ratio. If the actual S/C ratio is equal to the desired S/C ratio, the method follows the Yes leg back to block 262 and the method is repeated. If the actual S/C ratio is not equal to the desired S/C ratio, the method follows the No leg to block 274, wherein the S/C ratio is adjusted. The method then returns to block 262, and the method is repeated.

Determining the stream temperatures at block 262 may be accomplished in any suitable manner, an illustrative, non-exclusive example of which includes utilizing steam stream temperature sensor 112 to produce steam stream temperature signal 114, utilizing carbon-containing feedstock stream temperature sensor 122 to produce carbon-containing feedstock stream temperature signal 126, and/or utilizing combined feedstock stream temperature sensor 132 to produce combined feedstock stream temperature signal 134. Calculating the S/C ratio in the combined feedstock stream at step 270 may include calculating the S/C ratio using any suitable method, including those disclosed herein. Similarly, adjusting the S/C ratio may be accomplished using any suitable method, such as by controlling the operation of carbon-containing feedstock delivery system 42, including carbon-containing feedstock flow-regulating device 44, and/or controlling the operation of steam delivery system 32, including water flow-regulating device 34, as discussed in more detail herein.

FIG. 9 is a flow chart providing illustrative, non-exclusive examples of pressure-based feedback control methods 280 according to the present disclosure that may be utilized to control the S/C ratio in the combined feedstock stream by controlling the carbon-containing feedstock supply pressure based at least in part on the desired S/C ratio and/or the flow rate of the steam stream. The methods include optionally determining the desired S/C ratio at step 282 and optionally determining the value of a variable associated with the flow rate of the steam stream at step 284. The methods then include determining the desired carbon-containing feedstock supply pressure at step 286 and measuring the actual carbon-containing feedstock supply pressure at step 288. The actual carbon-containing feedstock supply pressure is compared to the desired carbon-containing feedstock supply pressure at step 290. If the actual carbon-containing feedstock supply pressure is equal to the desired carbon-containing feedstock supply pressure, the Yes leg, or decision path, is followed to step 282, and the methods are repeated. If the actual carbon-containing feedstock supply pressure is not equal to the desired carbon-containing feedstock supply pressure, the No leg is followed to step 292, where the actual carbon-containing feedstock supply pressure is adjusted. The methods then return to step 282, and the methods are repeated.

Determining the desired S/C ratio and determining the value of the variable associated with the flow rate of the steam stream at steps 282 and 284 may be accomplished in any suitable manner, including those discussed in more detail herein. Determining the desired carbon-containing feedstock supply pressure at step 286 may include determining the desired carbon-containing feedstock supply pressure based at least in part on the desired S/C ratio and/or the value of the variable associated with the flow rate of the steam stream or may include a fixed and/or predetermined carbon-containing feedstock supply pressure as also discussed in more detail herein. Similarly, adjusting the actual carbon-containing feedstock supply pressure may include adjusting the actual carbon-containing feedstock supply pressure in any suitable manner, including those discussed in more detail herein.

The systems and methods disclosed herein have been described with reference to controlling the S/C ratio in a combined feedstock stream including a steam stream and a gaseous and/or vaporous carbon-containing feedstock stream. However, it is within the scope of the present disclosure that the systems and methods may be utilized to control the ratio of water molecules to carbon atoms in any suitable reactant streams that may be supplied to hydrogen-producing fuel processing system 12. These may include the gaseous and/or vaporous streams discussed herein, as well as liquid streams. Thus, carbon-containing feedstock source 43 may include any suitable liquid and/or gaseous source of carbon-containing feedstock and carbon-containing feedstock delivery system 42 is not required to include carbon-containing feedstock vaporizer 46 when carbon-containing feedstock source 43 includes a liquid source of carbon-containing feedstock. Similarly, while steam delivery system 32 is shown including an optional water vaporizer, it is within the scope of the present disclosure that the steam delivery system may deliver liquid water to mixing device 23 and also may be referred to as water delivery system 32.

In addition, while the systems and methods disclosed herein are shown utilizing a single controller that may include multiple components, it is within the scope of the present disclosure that a plurality of controllers may be used. This may include the use of separate and/or distinct controllers to control the operation of the various components of hydrogen-producing fuel processing system 12 and/or hydrogen-producing and consuming assembly 10. These controllers may operate independently and/or cooperatively and may include dedicated and/or integrated controllers as well as separate, stand-alone computing devices that may be located proximal to or distal from the hydrogen-producing fuel processing system.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the corresponding structure, element, component controller, method, or other recited subject matter is designed and/or intended to perform a given function. Thus, the use of the terms "adapted" and "configured" should not be construed to mean that a recited subject matter is simply "capable of" performing a given function but that the recited subject matter is specifically designed, positioned, created, or otherwise implemented for the purpose of performing the function. Likewise, subject matter that is recited herein as being "adapted to" perform a function may additionally or alternatively be expressed as being "configured to" perform the function, and vice versa.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method of controlling the operation of a hydrogen-producing fuel processing system that includes a reactant delivery system, the method comprising:
providing a carbon-containing feedstock stream from a carbon-containing feedstock source;
supplying a water stream from a water source;
measuring a property of at least one of the carbon-containing feedstock stream and the water stream;
combining the carbon-containing feedstock stream and the water stream to produce a combined feedstock stream;
controlling a steam-to-carbon ratio within the combined feedstock stream; and
delivering the combined feedstock stream to a hydrogen-producing region of the hydrogen-producing fuel processing system to produce a mixed gas stream that includes hydrogen gas as a majority component.

A2. The method of paragraph A1, wherein the method includes vaporizing the water stream to produce a steam stream, and optionally wherein the method includes vaporizing the water stream in a water vaporizer.

A3. The method of any of paragraphs A1-A2, wherein the measuring includes measuring a temperature of at least one of the water stream, the steam stream, the carbon-containing feedstock stream, and/or the combined feedstock stream.

A4. The method of paragraph A3, wherein the controlling includes controlling based at least in part on the temperature of the steam stream, the temperature of the carbon-containing feedstock stream, and the temperature of the combined feedstock stream.

A5. The method of paragraph A4, wherein the controlling includes controlling based on a comparison of the temperatures of the steam stream and the carbon-containing feedstock stream to the temperature of the combined feedstock stream.

A6. The method of any of paragraphs A4-A5, wherein the controlling includes controlling based on calculations related to the temperatures of the steam stream, the carbon-containing feedstock stream, and the combined feedstock stream.

A7. The method of any of paragraphs A4-A6, wherein the controlling includes controlling based on calculations related to the thermal energy contained within the steam stream, the carbon-containing feedstock stream, and the combined feedstock stream.

A8. The method of any of paragraphs A4-A7, wherein the controlling includes controlling based on calculations related to the thermodynamic properties of the steam stream, the carbon-containing feedstock stream, and the combined feedstock stream.

A9. The method of any of paragraphs A3-A8, wherein the method further includes calculating the steam-to-carbon ratio in the combined feedstock stream from the temperature of the steam stream, the temperature of the carbon-containing feedstock stream, and the temperature of the combined feedstock stream and controlling the steam-to-carbon ratio to a desired steam-to-carbon ratio.

A10. The method of any of paragraphs A3-A9, wherein calculating the steam-to-carbon ratio in the combined feedstock stream includes calculating the steam-to-carbon ratio utilizing the formula:

$$\frac{S}{C} = \frac{\left[\frac{a_{CCF}}{2}(T_{CF}^2 - T_{CCF}^2) + b_{CCF}(T_{CF} - T_{CCF})\right]}{\left[\frac{a_S}{2}(T_S^2 - T_{CF}^2) + b_S(T_S - T_{CF})\right]x}.$$

A11. The method of any of paragraphs A1-A10, wherein the controlling includes controlling at least one of a flow rate of the carbon-containing feedstock stream and a flow rate of the water stream.

A12. The method of any of paragraphs A9-A11, wherein the controlling includes a feedforward portion, and further wherein the method includes controlling the flow rate of the carbon-containing feedstock stream and the flow rate of the water stream based at least in part on the desired steam-to-carbon ratio and a desired flow rate of the mixed gas stream from the hydrogen-producing region.

A13. The method of paragraph A12, wherein the controlling further includes a feedback portion, and further wherein the method includes adjusting at least one of the flow rate of the carbon-containing feedstock stream and the flow rate of the water stream based on a comparison of the calculated steam-to-carbon ratio to the desired steam-to-carbon ratio.

A14. The method of any of paragraphs A1-A13, wherein the method further includes supplying the steam stream to a primary inlet of a velocity pump.

A15. The method of paragraph A14, wherein the method further includes generating a vacuum at a secondary inlet of the velocity pump and providing the carbon-containing feedstock stream to the secondary inlet of the velocity pump.

A16. The method of any of paragraphs A14-A15, wherein the velocity pump includes at least one of an ejector pump, a jet pump, and/or a venturi pump.

A17. The method of any of paragraphs A14-A16, wherein the measuring includes measuring a pressure of the carbon-containing feedstock stream associated with the secondary inlet of the ejector pump.

A18. The method of any of paragraphs A14-A17, wherein the method further includes regulating the pressure of the carbon-containing feedstock stream associated with the secondary inlet of the ejector pump with a carbon-containing feedstock flow-regulating device.

A19. The method of paragraph A18, wherein the carbon-containing feedstock flow-regulating device includes at least one of a carbon-containing feedstock compressor, a carbon-containing feedstock pump, a carbon-containing feedstock pressure regulator, and/or a carbon-containing feedstock mass flow controller.

A20. The method of any of paragraphs A14-A19, wherein the controlling includes a feedforward portion adapted to control the flow rate of the water stream based at least in part on a desired flow rate of the mixed gas stream from the hydrogen-producing region and a desired steam-to-carbon ratio.

A21. The method of any of paragraphs A14-A20, wherein the controlling includes a feedback portion adapted to control a pressure of the carbon-containing feedstock stream associated with the secondary inlet of the ejector pump by controlling the operation of the carbon-containing feedstock flow-regulating device.

A22. The method of paragraph A21, wherein the controlling includes controlling the pressure of the carbon-containing feedstock stream associated with the secondary inlet of the velocity pump based at least in part on a desired steam-to-carbon ratio.

A23. The method of any of paragraphs A21-A22, wherein the controlling includes controlling the pressure of the carbon-containing feedstock stream associated with the secondary inlet of the velocity pump based at least in part on a value of a variable associated with the flow rate of the steam stream.

A24. The method of paragraph A23, wherein the variable associated with the flow rate of the steam stream includes at least one of a steam supply pressure, a steam stream flow rate, a combined feedstock stream flow rate, a product hydrogen stream flow rate, a magnitude of a demand for the product hydrogen stream by a hydrogen-consuming device, and/or a magnitude of an electrical load applied by an energy-consuming device.

A25. The method of any of paragraphs A1-A24, wherein the carbon-containing feedstock includes at least one of methane, propane, natural gas, a hydrocarbon, and/or an alcohol.

A26. The method of any of paragraphs A1-A25, wherein the method further includes vaporizing the carbon-containing feedstock stream, and optionally wherein the method includes vaporizing the carbon-containing feedstock in a carbon-containing feedstock vaporizer.

A27. The method of any of paragraphs A1-A26, wherein the method further includes vaporizing the combined feedstock stream, and optionally wherein the method includes vaporizing the combined feedstock stream in a combined feedstock stream vaporizer.

A28. The method of any of paragraphs A1-A27, wherein the method further includes measuring a property of the combined feedstock stream.

A29. The method of any of paragraphs A1-A28, wherein the measuring includes measuring at least one of a physical property, a thermodynamic property, a chemical property, a temperature, a pressure, and/or a flow rate of at least one of the steam stream, the carbon-containing feedstock stream, and/or the combined feedstock stream.

A30. The method of any of paragraphs A1-A29, wherein the combining includes combining at least one of the steam stream and the water stream with the carbon-containing feedstock stream within a mixing device.

A31. The method of paragraph A30, wherein the mixing device includes a thermally insulated volume.

A32. The method of any of paragraphs A29-A31, wherein the mixing device includes a velocity pump.

A33. The method of any of paragraphs A1-A32, wherein the combining is at least substantially adiabatic.

A34. The method of any of paragraphs A1-A33, wherein the combining is at least substantially isenthalpic.

A35. The method of any of paragraphs A1-A34, wherein the controlling includes controlling a flow-regulating device.

A36. The method of paragraph A35, wherein the flow-regulating device includes at least one of a pressure regulator, a pump, a compressor, and a mass flow controller.

A37. The method of any of paragraphs A1-A36, wherein the controlling includes controlling a ratio of the carbon-containing feedstock stream to the water stream to control a steam-to-carbon ratio in the combined feedstock stream.

A38. The method of paragraph A37, wherein the controlling includes controlling the steam-to-carbon ratio to be between 2:1 and 5:1, optionally including steam-to-carbon ratios between 2:1 and 4:1, 2.5:1 and 4.5:1, 2.5:1 and 3.5:1, and 3:1 and 4:1, and further optionally including steam-to-carbon ratios of 2.25:1, 2.5:1, 2.75:1, 3:1, 3.25:1, 3.5:1, 4:1, and 4.5:1.

A39. The method of any of paragraphs A1-A38, wherein the hydrogen-producing region includes at least one of a reformer, a steam reformer, an autothermal reformer, and/or a partial oxidation reformer.

A40. The method of any of paragraphs A1-A39, wherein the method further includes sending at least a portion of the mixed gas stream to a separation assembly to produce a product hydrogen stream and a byproduct stream.

A41. The method of paragraph A40, wherein the separation assembly includes a membrane separation assembly including a hydrogen-selective membrane.

A42. The method of any of paragraphs A40-A41, wherein the separation assembly includes a pressure swing adsorption separation assembly.

A43. The method of any of paragraphs A1-A42, wherein the method further includes regulating a pressure of the mixed gas stream.

A44. The method of paragraph A43, wherein the regulating includes regulating the pressure of the mixed gas stream with a back pressure regulator adapted to maintain the pressure of the mixed gas stream at a desired mixed gas stream pressure.

A45. The method of any of paragraphs A1-A44, wherein the method further includes reacting at least a portion of the mixed gas stream with an oxidant stream in a fuel cell stack and producing an electrical output therefrom.

A46. The method of paragraph A45, wherein the method further includes satisfying at least a portion of an applied load from an energy-consuming device with the electrical output.

A47. The method of any of paragraphs A1-A46, wherein the method further includes combusting a fuel stream in a burner assembly to produce a heated exhaust stream, and optionally wherein the burner assembly includes a plurality of burner assemblies.

A48. The method of paragraph A47, wherein the fuel stream is supplied from the carbon-containing feedstock source.

A49. The method of any of paragraphs A47-A48, wherein the fuel stream includes a combustible fuel.

A50. The method of any of paragraphs A47-A49, wherein the fuel stream includes at least one of the byproduct stream, product hydrogen stream, and/or the mixed gas stream.

A51. The method of any of paragraphs A47-A50, wherein the method further includes heating at least one of the hydrogen-producing region and the vaporizer with the heated exhaust stream.

B1. A hydrogen-producing fuel processing system including a reactant delivery system, the reactant delivery system comprising:
a steam source adapted to produce a steam stream;
a carbon-containing feedstock source adapted to supply a carbon-containing feedstock;
a carbon-containing feedstock flow-regulating device adapted to accept the carbon-containing feedstock from the carbon-containing feedstock source and produce a carbon-containing feedstock stream;
a mixing device adapted to combine the steam stream and the carbon-containing feedstock stream to produce a combined feedstock stream;
a hydrogen-producing region adapted to accept the combined feedstock stream and produce a mixed gas stream including hydrogen gas therefrom;
a sensor assembly adapted to detect a property of at least one of the steam stream, the carbon-containing feedstock stream, and the combined feedstock stream; and
a controller configured to control a flow rate of the combined feedstock stream and a steam-to-carbon ratio in the combined feedstock stream.

B2. The system of paragraph B1, wherein the steam source includes a water source adapted to supply water, a water flow-regulating device adapted to accept the water from the water source and to produce a water stream, and a water vaporizer adapted to vaporize the water stream to produce the steam stream.

B3. The system of paragraph B2, wherein the sensor assembly includes at least one of a steam stream temperature sensor adapted to detect a temperature of the steam stream, a carbon-containing feedstock stream temperature sensor adapted to detect a temperature of the carbon-containing feedstock stream, and a combined feedstock stream temperature sensor adapted to detect a temperature of the combined feedstock stream.

B4. The system of paragraph B3, wherein the controller is configured to control the flow rate of the combined feedstock stream and the steam-to-carbon ratio of the combined feedstock stream by controlling the operation of at least one of the water flow-regulating device and the carbon-containing feedstock flow-regulating device based at least in part on the temperature of the steam stream, the temperature of the carbon-containing feedstock stream, the temperature of the combined feedstock stream, and a desired flow rate of the mixed gas stream.

B5. The system of an of paragraphs B2-B4, wherein the controller includes a feedforward portion adapted to control the operation of the water flow-regulating device and the carbon-containing feedstock flow-regulating device based at least in part on the desired flow rate of the mixed gas stream and a desired steam-to-carbon ratio in the combined feedstock stream.

B6. The system of any of paragraphs B2-B5, wherein the controller includes a feedback portion adapted to adjust the operation of at least one of the water flow-regulating device and the carbon-containing feedstock flow-regulating device based at least in part on the temperature of the steam stream, the temperature of the carbon-containing feedstock stream, the temperature of the combined feedstock stream, and the desired steam-to-carbon ratio in the combined feedstock stream.

B7. The system of any of paragraphs B2-B6, wherein the sensor assembly includes a carbon-containing feedstock stream pressure sensor adapted to detect a pressure of the carbon-containing feedstock stream.

B8. The system of paragraph B7, wherein the controller is configured to control at least one of a flow rate of the combined feedstock stream, a pressure of the carbon-containing feedstock stream, and/or a steam-to-carbon ratio in the combined feedstock stream by controlling the operation of at least one of the water flow-regulating device and the carbon-containing feedstock flow-regulating device based at least in part on the pressure of the carbon-containing feedstock stream and a desired flow rate of the mixed gas stream.

B9. The system of any of paragraphs B7-B8, wherein the mixing device includes at least one of a velocity pump, an ejector pump, a jet pump, or a venturi pump.

B10. The system of paragraph B9, wherein the steam stream is supplied to a primary inlet of the mixing device and the carbon-containing feedstock stream is supplied to a secondary inlet of the mixing device.

B11. The system of any of paragraphs B2-B10, wherein the controller includes a feedforward portion adapted to control the operation of the water flow-regulating device based at least in part on the desired flow rate of the mixed gas stream.

B12. The system of any of paragraphs B2-B11, wherein the controller includes a feedback portion adapted to control the operation of the carbon-containing feedstock flow-regulating device based at least in part on at least one of the pressure of the carbon-containing feedstock stream, a desired steam-to-carbon ratio in the combined feedstock stream, and/or a value of a variable associated with the flow rate of the steam stream.

B13. The system of paragraph B12, wherein the variable associated with the flow rate of the steam stream includes at least one of a steam supply pressure, a steam stream flow rate, a combined feedstock stream flow rate, a product hydrogen stream flow rate, a magnitude of a demand for the product hydrogen stream by a hydrogen-consuming device, and/or a magnitude of an electrical load applied by an energy-consuming device.

B14. The system of any of paragraphs B1-B13, wherein the system further includes a burner assembly adapted to combust a fuel stream including at least one of the carbon-containing feedstock, the mixed gas stream, the product hydrogen stream, and/or the byproduct stream to produce a heated exhaust stream, and optionally wherein the burner assembly includes a plurality of burner assemblies.

B15. The system of paragraph B14, wherein the heated exhaust stream is used to heat at least one of the water vaporizer and the hydrogen-producing region.

B16. The system of paragraph B15, wherein the controller includes a burner control portion adapted to control the flow rate of the fuel stream to the burner assembly based at least in part on at least one of a desired temperature of the burner assembly, a desired temperature of the water vaporizer, a desired temperature of the steam stream, a desired temperature of the hydrogen-producing region, a heat demand from the water vaporizer, and/or a heat demand from the hydrogen-producing region.

B17. The system of any of paragraphs B1-B16, wherein the system further includes a separation assembly adapted to accept at least a portion of the mixed gas stream and to separate the portion of the mixed gas stream into a product hydrogen stream and a byproduct stream.

B18. The system of paragraph B17, wherein the separation assembly includes at least one of a pressure swing adsorption assembly and a membrane separation assembly.

B19. The system of any of paragraphs B1-B18, wherein the system further includes a fuel cell stack adapted to accept at least a portion of the product hydrogen stream and an oxidant stream and produce an electrical output therefrom, and optionally wherein the electrical output is supplied to an energy-consuming device to satisfy an applied load from the energy-consuming device.

B20. The system of any of paragraphs B1-B19, wherein the system further includes a back pressure regulator between the separation assembly and the fuel cell stack, and further wherein the back pressure regulator is adapted to control the pressure upstream of the back pressure regulator.

C1. The use of any of the methods of paragraphs A1-A51 with any of the systems of paragraphs B1-B19.

C2. The use of any of the systems of paragraphs B1-B19 with any of the methods of paragraphs A1-A51.

C3. The fuel cell system of any of paragraphs B1-B19, wherein the controller is configured to perform any of the methods of paragraphs A1-A51.

C4. A hydrogen-producing fuel processing system including a controller adapted to perform any of the methods of paragraphs A1-A51.

C5. A hydrogen-producing and consuming assembly including a reactant delivery system, a hydrogen-producing fuel processing system, a fuel cell stack, and a controller adapted to perform any of the methods of paragraphs A1-A51.

INDUSTRIAL APPLICABILITY

The systems and methods for actively controlling steam-to-carbon ratio in hydrogen-producing reformers disclosed herein are applicable to the hydrogen-production and fuel cell industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of controlling the operation of a hydrogen-producing fuel processing system that includes a reactant delivery system, the method comprising:
providing a carbon-containing feedstock stream from a carbon-containing feedstock source;
supplying a steam stream from a steam source;
combining the carbon-containing feedstock stream and the steam stream to produce a combined feedstock stream;
measuring a temperature of the steam stream, a temperature of the carbon-containing feedstock stream, and a temperature of the combined feedstock stream;
controlling a steam-to-carbon ratio within the combined feedstock stream, wherein the Controlling includes controlling based at least in part on the temperature of the steam stream, and at least in part on the temperature of the carbon-containing feedstock stream, and at least in part on the temperature of the combined feedstock stream; and
applying the combined feedstock stream to a hydrogen-producing region of the hydrogen-producing fuel processing system to produce a mixed gas stream that includes hydrogen gas as a majority component.

2. The method of claim 1, wherein the method further includes calculating the steam-to-carbon ratio in the combined feedstock stream from the temperature of the steam stream, the temperature of the carbon-containing feedstock stream, and the temperature of the combined feedstock stream, and further wherein the controlling includes controlling the steam-to-carbon ratio to a desired steam-to-carbon ratio.

3. The method of claim 2, wherein calculating the steam-to-carbon ratio in the combined feedstock stream includes calculating the steam-to-carbon ratio utilizing the formula:

$$\frac{S}{C} = \frac{\left[\frac{a_{CCF}}{2}(T_{CF}^2 - T_{CCF}^2) + b_{CCF}(T_{CF} - T_{CCF})\right]}{\left[\frac{a_S}{2}(T_S^2 - T_{CF}^2) + b_S(T_S - T_{CF})\right]x}.$$

4. The method of claim 1, wherein the controlling includes controlling at least one of a flow rate of the carbon-containing feedstock stream and a flow rate of the steam stream.

5. The method of claim 4, wherein the controlling includes a feedforward portion, and further wherein the method includes controlling the flow rate of the carbon-containing feedstock stream and the flow rate of the steam stream based at least in part on the desired steam-to-carbon ratio and a desired flow rate of the mixed gas stream from the hydrogen-producing region.

6. The method of claim 4, wherein the controlling further includes a feedback portion, and further wherein the method includes adjusting at least one of the flow rate of the carbon-containing feedstock stream and the flow rate of the steam stream based at least in part on a comparison of a calculated steam-to-carbon ratio to a desired steam-to-carbon ratio.

7. The method of claim 1, wherein the carbon-containing feedstock includes at least one of methane, propane, and natural gas.

8. The method of claim 1, wherein the combining includes combining the steam stream and the carbon-containing feedstock stream within a mixing device.

9. The method of claim 1, wherein the combining is at least substantially isenthalpic.

10. The method of claim 1, wherein the controlling includes controlling a flow-regulating device, and further wherein the flow-regulating device includes at least one of a pressure regulator, a pump, and a compressor.

11. The method of claim 1, wherein the controlling includes controlling a ratio of the carbon-containing feedstock stream to the steam stream to control the steam-to-carbon ratio in the combined feedstock stream, and further wherein the controlling includes controlling the steam-to-carbon ratio to be between 2:1 and 2.5:1.

12. The method of claim 1, wherein the hydrogen-producing region includes a steam reforming region.

13. The method of claim 1, wherein the method further includes reacting at least a portion of the mixed gas stream with an oxidant stream in a fuel cell stack and producing an electrical output therefrom.

* * * * *